(12) United States Patent
Ojha et al.

(10) Patent No.: US 11,616,782 B2
(45) Date of Patent: Mar. 28, 2023

(54) CONTEXT-AWARE CONTENT OBJECT SECURITY

(71) Applicant: Box, Inc., Redwood City, CA (US)

(72) Inventors: Alok Ojha, Newark, CA (US); Sivaramakrishnan Subramanian, San Jose, CA (US); Kechen Huang, Menlo Park, CA (US); Pal Ramanathan, Foster City, CA (US); Varun Parmar, Los Altos, CA (US); Yi Zhao, Redwood City, CA (US)

(73) Assignee: Box, Inc., Redwood City, CA (US)

( * ) Notice: Subject to any disclaimer, the term of this patent is extended or adjusted under 35 U.S.C. 154(b) by 142 days.

(21) Appl. No.: 16/948,828

(22) Filed: Oct. 1, 2020

(65) Prior Publication Data
US 2021/0021600 A1   Jan. 21, 2021

Related U.S. Application Data

(63) Continuation-in-part of application No. 16/553,057, filed on Aug. 27, 2019.
(Continued)

(51) Int. Cl.
*H04L 9/40* (2022.01)

(52) U.S. Cl.
CPC ........ *H04L 63/101* (2013.01); *H04L 63/0823* (2013.01); *H04L 63/102* (2013.01);
(Continued)

(58) Field of Classification Search
CPC ..... H04L 63/205; H04L 63/10; H04L 63/101; H04L 63/105; H04L 63/20
See application file for complete search history.

(56) References Cited

U.S. PATENT DOCUMENTS 10,552,590 B2    2/2020  Hamlin et al.
10,726,152 B1 *  7/2020  Durham .................. H04L 63/10
(Continued)

OTHER PUBLICATIONS

J. Alqatawna, E. Rissanen and B. Sadighi, "Overriding of Access Control in XACML," Eighth IEEE International Workshop on Policies for Distributed Systems and Networks (POLICY'07), 2007, pp. 87-95 (Year: 2007).*
(Continued)

*Primary Examiner* — Michael R Vaughan
(74) *Attorney, Agent, or Firm* — Vista IP Law Group, LLP

(57) ABSTRACT

As a default, a global permissions model is established. The global permissions model serves for applying a first set of resource access permissions to shared content objects. Additionally, a set of context-aware access policies that govern user interactions over the shared content object is established. When a particular user requests an interaction over a shared content object, then interaction attributes associated with the request are gathered. The context-aware access policies are applied to the request by determining a set of extensible access permissions that are derived from the interaction attributes. The context-aware access policies are enforced by overriding the first set of resource access permissions with dynamically-determined access permissions. When a particular access request is denied, a response is generated in accordance with the set of extensible access permissions and the user is notified. In some cases, the access request is permitted, but only after the user provides a justification.

20 Claims, 17 Drawing Sheets

Related U.S. Application Data

(60) Provisional application No. 62/706,867, filed on Sep. 14, 2020, provisional application No. 62/909,683, filed on Oct. 2, 2019, provisional application No. 62/723,314, filed on Aug. 27, 2018, provisional application No. 62/723,435, filed on Aug. 27, 2018.

(52) U.S. Cl.
CPC .......... *H04L 63/105* (2013.01); *H04L 63/108* (2013.01); *H04L 63/20* (2013.01)

(56) References Cited

U.S. PATENT DOCUMENTS

| | | | |
|---|---|---|---|
| 10,902,072 B2 | 1/2021 | Anders et al. | |
| 10,979,432 B1* | 4/2021 | Frank | H04L 63/104 |
| 2003/0018890 A1* | 1/2003 | Hale | H04L 63/0823 |
| | | | 713/156 |
| 2009/0307746 A1* | 12/2009 | Di | H04W 12/088 |
| | | | 726/1 |
| 2014/0208425 A1* | 7/2014 | Palomaki | G06F 21/565 |
| | | | 726/23 |
| 2015/0089575 A1* | 3/2015 | Vepa | H04L 63/08 |
| | | | 726/1 |
| 2015/0227756 A1* | 8/2015 | Barbas | G06F 21/6227 |
| | | | 707/783 |
| 2016/0070758 A1* | 3/2016 | Thomson | G16H 10/60 |
| | | | 707/781 |
| 2016/0117495 A1* | 4/2016 | Li | H04L 63/105 |
| | | | 726/1 |
| 2018/0114015 A1* | 4/2018 | Nuseibeh | H04L 67/1095 |
| 2018/0124609 A1* | 5/2018 | Ciano | G06F 21/629 |
| 2020/0092337 A1 | 3/2020 | Ojha et al. | |

OTHER PUBLICATIONS

De Filippi, P., et al., "Cloud Computing: Centralization and Data Sovereignty," dated 2012, electronic copy available at: https://ssrn.com/abstract=2167372.

Chen, Y., et al. "What's New About Cloud Computing Security?" Electrical Engineering and Computer Sciences University of California at Berkeley, Technical Report No. UCB/EECS-2010-5, http://www.eecs.berkeley.edu/Pubs/TechRpts/2010/EECS-2010-5.html, dated Jan. 20, 2010.

Notice of Allowance for U.S. Appl. No. 16/553,063 dated Sep. 21, 2022.

International Search Report and Written Opinion dated Dec. 11, 2019 for PCT Appln. No. PCT/US19/48435.

Non-Final Office Action dated Feb. 17, 2022 U.S. Appl. No. 16/553,057.

Non-Final Office Action for U.S. Appl. No. 16/553,063 dated Mar. 3, 2022.

Final Office Action dated Oct. 7, 2021 U.S. Appl. No. 16/553,063.

Non-Final Office Action dated Jun. 8, 2021 U.S. Appl. No. 16/553,063.

European Search Report dated Sep. 20, 2021 for related EP Applicatio No. 19853611.2.

Notice of Allowance dated Jun. 24, 2022 for U.S. Appl. No. 16/553,063.

Final Office Action dated Jul. 21, 2022; U.S. Appl. No. 16/553,057.

Notice of Allowance for U.S. Appl. No. 16/553,063 dated Feb. 1, 2023.

* cited by examiner

7E00

Justification User Interface

Select Applicable Options ▲

Approved Partner Project ☑

Approved partner projects are governed by the policies of the company.

---

Approved Business Process ☐

Approved business processes are governed by the policies of the company.

---

Approved Contractor Project ☐

Approved contractor/partner projects are governed by the policies of the company.

---

Time Bounded Justification ☐

From: <start date>

To: <end date>

---

Send renewal reminder ☐

} Policy-specific Justification Options 793

FIG. 7E

CONTEXT-AWARE CONTENT OBJECT SECURITY

RELATED APPLICATIONS

The present application is a continuation in part of, and claims the benefit of priority to co-pending U.S. patent application Ser. No. 16/553,057 titled "CONTEXT-AWARE CONTENT OBJECT SECURITY", filed on Aug. 27, 2019, which claims the benefit of priority to U.S. Provisional Patent Application Ser. No. 62/723,314 titled "COLLABORATION SYSTEM SECURITY", filed on Aug. 27, 2018; and which claims the benefit of priority to U.S. Provisional Patent Application Ser. No. 62/723,435 titled "COLLABORATION SYSTEMS", filed on Aug. 27, 2018; and this application claims the benefit of priority to U.S. Patent Application Ser. No. 62/909,683 titled "WORKFLOW IMPLEMENTATION", filed on Oct. 2, 2019; and this application claims the benefit of priority to U.S. Provisional Patent Application Ser. No. 62/706,867 titled "CROSS-ENTERPRISE WORKFLOW ADAPTATION", filed on Sep. 14, 2020, all of which are hereby incorporated by reference in their entirety.

FIELD

This disclosure relates to content management systems, and more particularly to techniques for context-aware content object security.

BACKGROUND

Cloud-based content management services and systems have impacted the way personal and enterprise computer-readable content objects (e.g., documents, spreadsheets, images, programming code files, etc.) are stored, and has also impacted the way such personal and enterprise content objects are shared and managed. Content management systems provide the ability to securely share large volumes of content objects among trusted users (e.g., collaborators) on a variety of user devices such as mobile phones, tablets, laptop computers, desktop computers, and/or other devices.

In some systems, sharing and collaboration activities include one or more interactions (e.g., authoring, editing, viewing, etc.) that are performed over the content objects. The interactions may be performed by one user, or by multiple users, and/or even autonomously by one or more computing entities (e.g., processes, agents, applications, etc.). Moreover, such interactions may span across multiple departments and/or multiple enterprises.

The interactions by users over content objects in such content management systems are governed in accordance with certain resource access permissions associated with the various combinations of users and content objects. In some settings, resource access permissions may correspond to not only users and content objects, but also may correspond to connections, services, URLs, and/or other resources associated with the content management system.

Resource access permissions for specific resources often comply with a global permissions model that is implemented and managed at the content management system. A global permissions model defines a single set of semantics and workflows to efficiently manage (e.g., assign, lookup, etc.) resources permissions over the many resources of a content management system. As one example, a global permissions model might predefine a set of user roles (e.g., owner, co-owner, editor, viewer, previewer, uploader, etc.), a set of permitted content object interactions (e.g., edit, download, preview, view/add comments, view metadata, etc.), and a set of mappings between the aforementioned user roles and the permitted content object interactions. In this case, a user can be assigned a particular user role for a particular content object so as to restrict the user to performing only those permitted interactions associated with that user's role over that content object.

Unfortunately, in today's dynamic collaboration environments, using such a global permissions model is deficient. Specifically, the static nature of the global permissions model is deficient in addressing the many dynamic contexts of the interactions with the content objects performed at a content management system. Such interaction contexts are defined not only by a user's role as pertains to a content object, but also by the enterprise of the user, the application being used for the interaction, and/or by other interaction attributes.

To illustrate, consider a first user from a first enterprise and a second user from a second enterprise who have been assigned user roles (e.g., "previewer"), in accordance with a global permissions model of a content management system, that permits both users to download any content objects in a particular shared folder managed by the content management system. When a new document is added to the shared folder by an owner at the first enterprise, the first user and the second user will inherit download privileges for the new document according to the global permissions model. In this case, however, the owner may want to restrict downloads of the document to only users at the first enterprise (e.g., due to certain sensitive information in the document).

One approach to implementing this restriction is to work with an admin at the second enterprise to change the user role (e.g., from "previewer" to "viewer") of the second user as pertains to the document. Another approach is to modify the global permissions model to define a new user role and associated set of mappings to address this particular download restriction context. Both approaches place a tremendous burden on human and computing resources associated with the content management system to overcome the deficiencies of the global permissions model. What is needed is a way to dynamically assign resource access permissions to particular interactions over content objects based on a user-justified override.

SUMMARY

The present disclosure describes techniques used in systems, methods, and in computer program products for context-aware content object security, which techniques advance the relevant technologies to address technological issues with legacy approaches. More specifically, the present disclosure describes techniques used in systems, methods, and in computer program products for context-aware extensible content object access permissions. Certain embodiments are directed to technologies for analyzing the attributes of interactions with content objects to dynamically determine extensible access permissions that override a global permissions model.

The disclosed embodiments modify and improve over legacy approaches. In particular, the herein-disclosed techniques provide technical solutions that address the technical problems attendant to the limited applicability of global permissions models in collaboration systems. Such technical solutions involve specific implementations (i.e., data organization, data communication paths, module-to-module interrelationships, etc.) that relate to the software arts for improving computer functionality.

The ordered combination of steps of the embodiments serve in the context of practical applications that perform steps to analyze various attributes of user interactions with content objects to dynamically determine extensible access permissions. The disclosed techniques for analyzing the attributes of interactions with content objects to dynamically determine extensible access permissions serve to overcome long standing yet heretofore unsolved technological problems that arise in the realm of computerized collaboration systems. Aspects of the present disclosure achieve performance and other improvements in peripheral technical fields including (but not limited to) computer security and distributed storage systems.

Some embodiments perform a series of steps for establishing a global permissions model that applies a first set of resource access permissions to a shared content object; establishing one or more context-aware access policies that govern user interactions over the shared content object; gathering one or more interaction attributes associated with a particular user interaction over the shared content object; applying the context-aware access policies to the one or more interaction attributes to determine a set of extensible access permissions; and overriding the first set of resource access permissions with the set of extensible access permissions.

Some embodiments perform further steps including generating a challenge that is issued to an authority to justify or otherwise allow a particular user interaction that would be disallowed in absence of a user-justified override. The determination of when to carry out a challenge—and the determination of when to allow the particular user interaction to proceed—can be based on the set of permissions that are in place at the time of the particular user interaction request. In some cases, the response corresponds to at least one of: allowing an interaction, allowing the interaction based on the validity of a particular justification, blocking the interaction, or taking no overriding action. In some cases, at least a portion of the challenge is presented to an authorizing user via a user interface.

Some embodiments process context-aware access policies wherein the context-aware access policies and/or extensible permissions rules are considered when processing a challenge and/or when determining the set of extensible access permissions.

In various embodiments, a context associated with the particular user interaction is characterized by one or more of the one or more interaction attributes, which interaction attributes comprise one or more user-justifications, one or more event attributes, and/or one or more object attributes, and/or one or more user attributes. User-justifications for override can be specified by a user at a user interface. Specifically, some embodiments include a user interface for selecting or otherwise inputting a justification for a particular requested action. In some embodiments, the acceptability of a justification is determined based on sentiment analysis and/or natural language processing techniques. In some embodiments, sentiment analysis and/or natural language processing is provided by one or more external data processing modules.

Some embodiments include a sequence of instructions that are stored on a non-transitory computer readable medium. Such a sequence of instructions, when stored in memory and executed by one or more processors, causes the one or more processors to perform a set of acts for implementing context-aware content object security over shared content objects.

Some embodiments include the aforementioned sequence of instructions that are stored in a memory, which memory is interfaced to one or more processors such that the one or more processors can execute the sequence of instructions to cause the one or more processors to implement context-aware content object security over shared content objects.

In various embodiments, any combinations of any of the above can be combined to perform any variations of acts for implementing context-aware content object security, and many such combinations of aspects of the above elements are contemplated.

Further details of aspects, objectives, and advantages of the technological embodiments are described herein, and in the drawings and claims.

BRIEF DESCRIPTION OF THE DRAWINGS

The drawings described below are for illustration purposes only. The drawings are not intended to limit the scope of the present disclosure.

FIG. 7E depicts a justification user interface, according to an embodiment.

DETAILED DESCRIPTION

Figure 1:
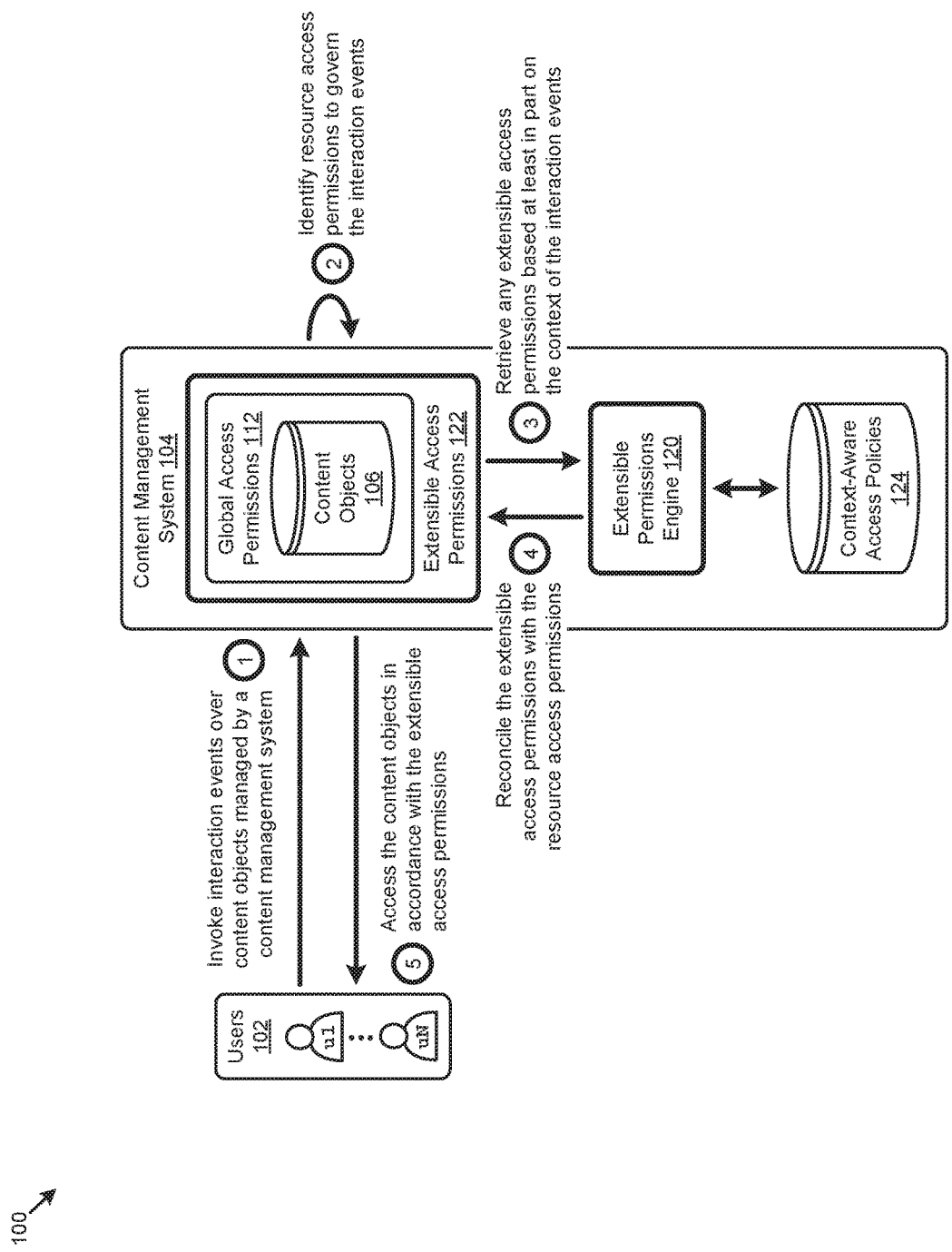
FIG. 1 exemplifies a computing environment in which embodiments of the present disclosure can be implemented.

Aspects of the present disclosure solve problems associated with collaboration systems that suffer from the limited applicability of global permissions models. These problems are unique to, and may have been created by, various computer-implemented permissions models used in content management systems. Some embodiments are directed to approaches for analyzing the attributes of interactions with content objects to dynamically determine extensible access permissions that override other permissions models. The accompanying figures and discussions herein present example environments, systems, methods, and computer program products for context-aware extensible content object access permissions.

Overview

Disclosed herein are techniques for analyzing the attributes of content object interactions so as to dynamically determine sets of extensible access permissions that govern user interactions over shared content objects. In exemplary embodiments, such techniques are implemented in a content management system that facilitates user-to-user interactions and user-to-content interactions over a plurality of users and a plurality of content objects.

Instances of context-aware access policies are established at the content management system to govern the interactions of the users over the content objects. When various interaction events associated with the user and content objects are detected (e.g., a request to download a content object), certain event attributes corresponding to the events are identified. The event attributes, and other attributes derived from the event attributes, constitute the interaction attributes that characterize the respective contexts of the interaction events. The interaction attributes are subjected to the context-aware access policies to determine sets of extensible access permissions that govern further interaction events. Specifically, responses to the interaction events are issued in accordance with the sets of extensible access permissions. As an example, for a particular interaction event (e.g., download request), a response might allow an action (e.g., "OK to download") associated with the event, or might block the action, or might allow the action only if accompanied with some justification by the requestor.

In some embodiments, classification labels are assigned to content objects to facilitate the determination of sets of extensible access permissions. In certain embodiments, the context-aware access policies comprise one or more extensible permissions rules that facilitate the determination of the sets of extensible access permissions. In certain embodiments, a conflict remediation capability is implemented in the content management system to resolve conflicts between different permissions models and/or conflicts between multiple access policies.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1 exemplifies a computing environment 100 in which embodiments of the present disclosure can be implemented. As an option, one or more variations of computing environment 100 or any aspect thereof may be implemented in the context of the architecture and functionality of the embodiments described herein.

FIG. 1 illustrates aspects pertaining to analyzing the attributes of interactions with content objects to dynamically determine extensible access permissions. Specifically, the figure presents a logical depiction of how the herein disclosed techniques can be used to override global access permissions with extensible access permissions that are derived from the contexts of content object interaction events. A representative set of high order operations are presented to illustrate how the herein disclosed techniques might be applied in a computing environment.

The logical depiction of FIG. 1 depicts a representative set of users 102 (e.g., user "u1", . . . , user "uN") who desire to interact with various instances of content objects 106 managed at a content management system 104. Users 102 may be users of content management system 104 which facilitates interactions (e.g., authoring, editing, viewing, etc.) over content objects 106 for sharing, collaboration, and/or other purposes. The interactions may be performed by one user, or by multiple users, and/or even autonomously by one or more computing entities (e.g., processes, agents, applications, etc.). Moreover, such interactions may span across multiple departments and/or multiple enterprises.

As illustrated, the interactions by users 102 over content objects 106 in content management system 104 are governed at least in part by sets of global access permissions 112 associated with the various combinations of users and content objects. In some settings, global access permissions may correspond to not only users and content objects, but also may correspond to connections, services, URLs, and/or other resources associated with the content management system. Such global access permissions may comply with a global permissions model that is implemented and managed at content management system 104. As used herein, a global permissions model is a scheme that defines an initial set (e.g., a default set) of resource permissions to the many resources of a content management system. In today's dynamic collaboration and shared content management environments, however, using such a global permissions model is deficient. Specifically, the limited flexibility of global access permissions 112 as derived from a global permissions model is deficient in addressing the many dynamic contexts in which user interactions with content objects 106 can occur. Some mechanism is needed to define a second set (e.g., an override set) of resource permissions. Moreover, such a mechanism needs to be flexible such that the second set (e.g., the override set) of resource permissions can be flexibly extended in accordance with a policy that can in turn be used to determine the specifics of the second set of permissions (e.g., the overridden permissions) to apply to the various types of resources and/or interactions in the content management system. As used herein, the act of overriding means to modify a previously established permission that was set by a global permissions model. Such modification serves to address the limited applicability of the aforementioned global permissions model.

Various challenges pertaining to the limited applicability of global permissions models are addressed at least in part by analyzing the attributes of interactions between users 102 and content objects 106 so as to dynamically determine sets of extensible access permissions 122 that govern the interactions. In the embodiment of FIG. 1, the techniques are facilitated at least in part by an extensible permissions engine 120 and a set of context-aware access policies 124 implemented at content management system 104. As used herein, extensible access permissions refer to characteristics that apply to then-current interactions between users and content objects, which characteristics are considered after a global permissions model has been established.

As shown, context-aware access policies 124 may be established by one or more of the users 102 (e.g., enterprise system administrators, etc.). When users 102 invoke interaction events over content objects 106 (operation 1), global access permissions 112 are first identified to govern the interaction events (operation 2). Extensible permissions engine 120 accesses the context-aware access policies 124 to retrieve any sets of extensible access permissions 122 to apply to the interaction events, which extensible access permissions are based at least in part on the context of the interaction events (operation 3).

The context of an interaction event, as used herein, comprises the set of conditions that correspond to the interaction event. Such conditions are often described by one or more interaction attributes. The interaction attributes can comprise event attributes and other attributes derived from the event attributes that correspond to a particular interaction event. In this case, the interaction attributes are applied to context-aware access policies 124 to determine the sets of extensible access permissions 122 for the respective interaction events.

As used herein, context-aware access policies are groups of extensible permissions rules, which extensible permissions rules are evaluated against at least a portion of the one or more interaction attributes to determine a set of extensible access permissions, which extensible access permissions allow or deny access to a content object that already has an assigned access permission. Such interaction attributes might derive from a particular context associated with the particular user interaction and/or such interaction attributes might derive from one or more event attributes, or might derive from one or more object attributes, or might derive from one or more user attributes. The heretofore mentioned contexts are defined at least in part by one or more context-aware access policies, which context-aware access policies can be specified by a user at a user interface.

It can happen that the semantics of extensible access permissions that derive from any one or more context-aware access policies may conflict with the semantics of the global access permissions. As such, the sets of extensible access permissions 122 are reconciled with the global access permissions (operation 4) to facilitate access to content objects 106 in accordance with the extensible access permissions 122 (operation 5). In some cases, responses to the interaction events are issued to users 102 in accordance with the extensible access permissions 122. As an example, for a particular interaction event (e.g., download request), a response might allow an action (e.g., download) associated with the event, block the action, allow the action with some justification by the requestor, and/or perform some other operation.

As depicted in FIG. 1, extensible access permissions 122 serves as a permissions layer (e.g., permission wrapper) that is managed, determined, and/or applied separately from the global access permissions 112. Moreover, this extensible context-aware permissions capability facilitated by the herein disclosed techniques serves to address the problems attendant to the limited applicability of global permissions models. As such, application of the techniques disclosed herein facilitate improvements in computer functionality that serve to reduce the demand for computer memory, reduce the demand for computer processing power, reduce network bandwidth use, and reduce the demand for inter-component communication. Specifically, consumption of such computing resources to facilitate manual permissions adjustments and/or global permissions models updates so as to accommodate newly discovered user-to-user and/or user-to-content interactions is eliminated.

One embodiment of techniques for such context-aware extensible access permissions assignment is disclosed in further detail as follows.

Figure 2:
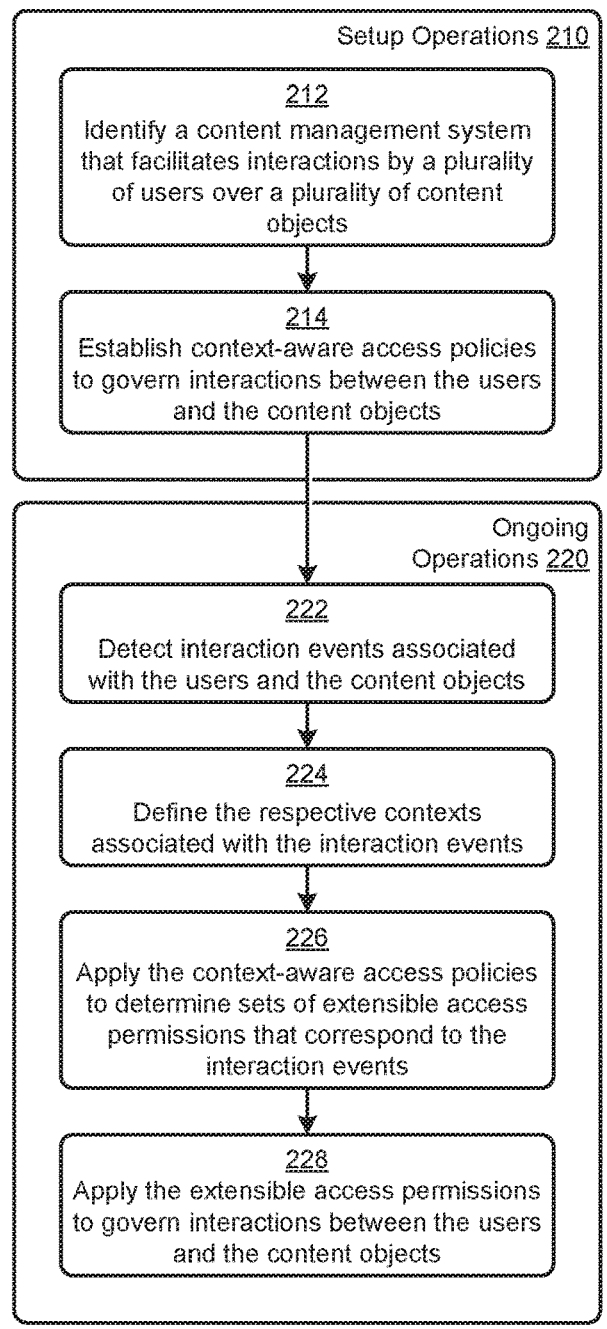
FIG. 2 exemplifies a context-aware extensible access permissions assignment technique as implemented in systems that enforce context-aware extensible content object access permissions, according to an embodiment.

FIG. 2 exemplifies a context-aware extensible access permissions assignment technique 200 as implemented in systems that enforce context-aware extensible content object access permissions. As an option, one or more variations of context-aware extensible access permissions assignment technique 200 or any aspect thereof may be implemented in the context of the architecture and functionality of the embodiments described herein. The context-aware extensible access permissions assignment technique 200 or any aspect thereof may be implemented in any environment.

FIG. 2 illustrates aspects pertaining to analyzing the attributes of interactions with content objects to dynamically determine extensible access permissions. Specifically, the figure is presented to illustrate one embodiment of certain steps and/or operations performed over a network of devices (e.g., user devices, computing systems, etc.) to determine sets of extensible access permissions for the interaction events based at least in part on the context of the interaction events. As can be observed, the steps and/or operations can be grouped into a set of setup operations 210 and a set of ongoing operations 220.

Setup operations 210 of context-aware extensible access permissions assignment technique 200 commences by identifying a content management system that facilitates interactions over a plurality of users and a plurality of content objects (step 212). Such interactions can involve both user-to-user interactions and user-to-content interactions. One or more context-aware access policies are established at the content management system to govern interactions between the user and the content objects in accordance with the context of the interactions (step 214). As used herein, a policy, such as a context-aware access policy, comprises a collection of electronically-stored parameters that serve to constrain one or more computing system operations. More specifically, a context-aware access policy comprises a set of policy parameters that are evaluated subject to the context of an invoked interaction event to determine certain permissions to govern over the interaction event.

As depicted in ongoing operations 220, when any such interaction events associated with the users and the content objects are detected (step 222), the respective contexts of the interaction events are determined (step 224). Such contexts are often described by one or more interaction attributes that can comprise event attributes and other attributes derived from the event attributes (e.g., user attributes, object attributes, resource attributes, etc.) that correspond to the interaction events.

The contexts (e.g., interaction attributes) of the interaction events are applied to the context-aware access policies to determine respective sets of extensible access permissions that correspond to the interaction events (step 226). As merely one example, the policy parameters of the context-aware access policies might codify sets of extensible permission rules that are evaluated subject to the interaction attributes describing the contexts to determine the sets of extensible access permissions. Then, the extensible access permissions are applied to govern interactions between the users and the content objects (step 228). Application of the extensible access permissions often raise responses to specific interaction events. The responses are then processed within the content management system. As examples, such responses might allow an interaction, or might block an interaction, or might allow an interaction with justification (e.g., as might be specified by a user desiring to perform the interaction).

One embodiment of a system, data flows, and data structures for implementing the context-aware extensible access permissions assignment technique 200 and/or other herein disclosed techniques, is disclosed as follows.

Figure 3:
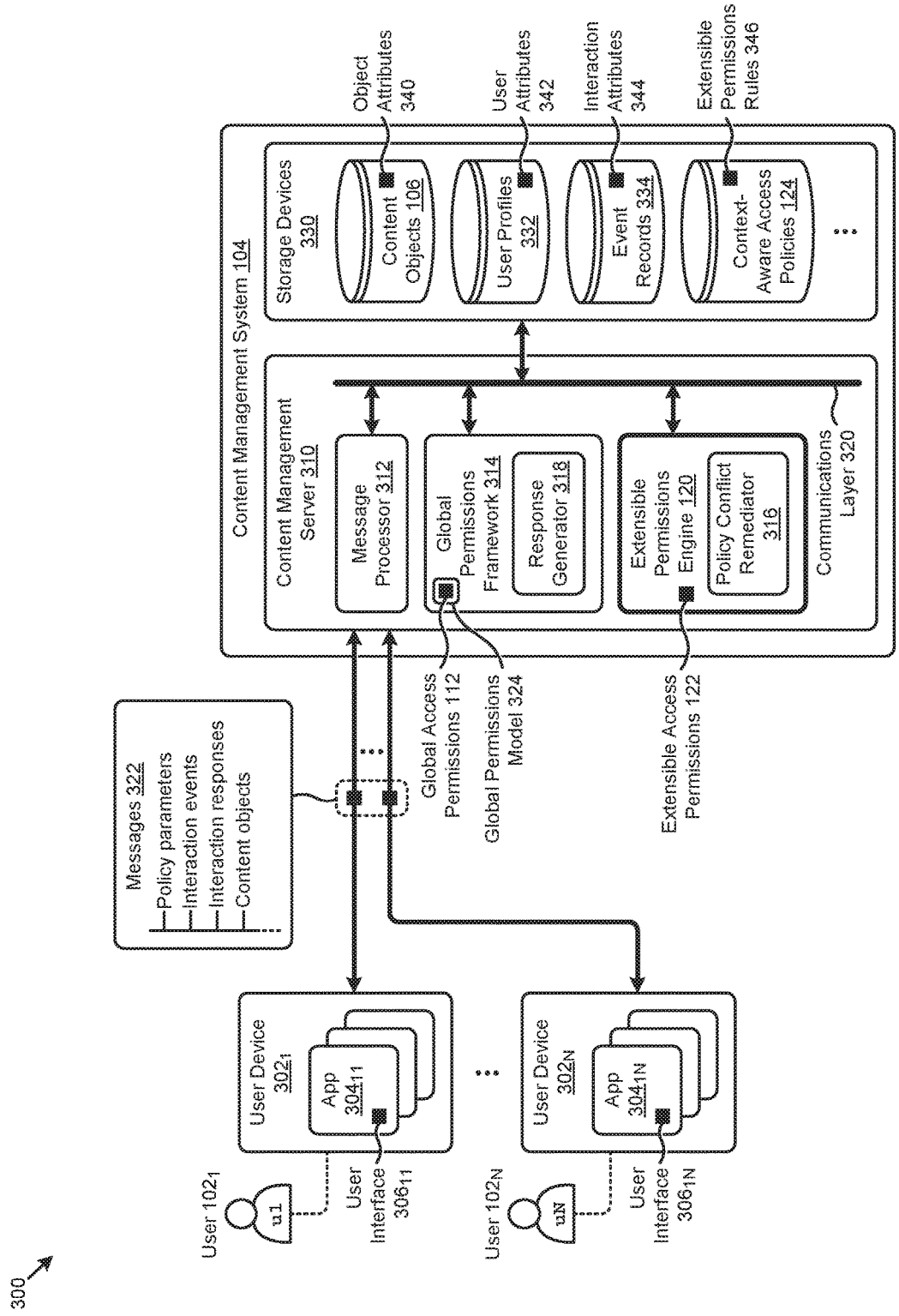
FIG. 3 presents a block diagram of a system that implements and enforces context-aware extensible content object access permissions, according to some embodiments.

FIG. 3 presents a block diagram of a system 300 that implements and enforces context-aware extensible content object access permissions. As an option, one or more variations of system 300 or any aspect thereof may be implemented in the context of the architecture and functionality of the embodiments described herein. The system 300 or any aspect thereof may be implemented in any environment.

FIG. 3 illustrates aspects pertaining to analyzing the attributes of interactions with content objects to dynamically determine extensible access permissions. Specifically, the figure is being presented to show one embodiment of certain representative components and associated data structures and data flows implemented in a computing environment to facilitate the herein disclosed techniques. As shown, the components, data flows, and data structures are associated with a set of users (e.g., user $102_1$, . . . , user $102_N$) that interact with each other and a set of content objects 106 managed at a content management system 104. The components, data flows, and data structures shown in FIG. 3 present one partitioning and associated data manipulation approach. The specific example shown is purely exemplary, and other subsystems, data structures, and/or partitionings are reasonable.

As shown, system 300 comprises an instance of a content management server 310 operating at content management system 104. Content management server 310 comprises a message processor 312, an instance of a global permissions framework 314 that comprises a response generator 318, and an instance of an extensible permissions engine 120 that comprises a policy conflict remediator 316. A plurality of instances of the foregoing components might operate at a plurality of instances of servers (e.g., content management server 310) at content management system 104 and/or any portion of system 300. Such instances can interact with a communications layer 320 to access each other and/or a set of storage devices 330 that store various information to support the operation of the components of system 300 and/or any implementations of the herein disclosed techniques.

For example, the servers and/or storage devices of content management system 104 might facilitate interactions over content objects 106 by the users (e.g., user $102_1$, . . . , user $102_N$) from a respective set of user devices (e.g., user device $302_1$, . . . , user device $302_N$). A content management system "manages" a plurality of content objects at least in part by maintaining (e.g., storing, updating, resolving interaction conflicts, etc.) the content objects subject to the various interactions performed over the content objects by the users of the content objects at their respective user devices. The content objects (e.g., files, folders, etc.) in content objects 106 are characterized at least in part by a set of object attributes 340 (e.g., content object metadata) stored at storage devices 330. Furthermore, the users are characterized at least in part by a set of user attributes 342 stored in a set of user profiles 332 at storage devices 330.

The users access instances of applications (e.g., app $304_{11}$, app $304_{1N}$) operating at their respective user devices to interact with the content objects 106 managed by content management system 104. Such applications might comprise native applications provided by content management system 104, or third-party applications that are integrated with content management system 104, which applications facilitate initiation and performance of interactions over the content objects. Various information pertaining to such integration with content management system 104 might be codified in a registry at content management system 104. As indicated, the applications often present user interfaces (e.g., user interface $306_{11}$, . . . , user interface $306_{1N}$) to the users to facilitate the interactions with content objects 106 and/or other communications with content management server 310 and/or content management system 104.

Specifically, the instances of the applications operating at the user devices send or receive various instances of messages 322 that are received or sent by message processor 312 at content management server 310. In some cases, messages 322 are sent to or received from content management server 310 without human interaction. One class of messages 322 pertains to the policy parameters that constitute various instances of context-aware access policies 124 stored in storage devices 330.

Such messages might be invoked, for example, by a system administrator (e.g., admin) submitting a policy creation form at a user interface of an application. In this case, the policy parameters derived from the information specified by the system administrator in the policy creation form are embedded in one or more instances of messages 322 and delivered to message processor 312. The policy parameters are then forwarded to extensible permissions engine 120 for analysis and storage in context-aware access policies 124.

Such analyses may include certain conflict remediation operations performed by policy conflict remediator 316. Conflict remediation may be applied when multiple parties specify conflicting policy parameters. The multiples parties may be within one enterprise or over two or more enterprises. As merely one example, a first admin in an enterprise might specify that no users external to the enterprise can download a particular content object, while a second admin might specify that external users can download the content object. Policy conflict remediator 316 will identify such conflicts and resolve them according to certain criteria (e.g., always select the most restrictive or conservative setting).

Another class of messages 322 corresponds to interaction events that are invoked by users when they interact with or attempt to interact with content objects 106. As examples, users might log in to any of the applications to interact with content objects they own or that are shared with them, to invite other users to collaborate on content objects, and/or to perform other collaboration activities. Any of the foregoing interactions or collaboration activities can be characterized as interaction events.

Message processor 312 at content management server 310 monitors the messages 322 to detect interaction events performed over the plurality of users and/or the plurality of content objects. Message processor 312 codifies certain interaction attributes 344 pertaining to interaction events in a set of event records 334 stored in storage devices 330. In some cases, message processor 312 will access any instances of user attributes 342 (e.g., user enterprise identifiers, etc.) stored in user profiles 332 and/or will access any instances the object attributes 340 (e.g., content object types, etc.) stored in content objects 106 to facilitate the populating of interaction attributes 344 that are included in event records 334.

Event records 334 and/or any other data described herein can be organized and/or stored using various techniques. For example, event records 334 might be organized and/or stored in a tabular structure (e.g., relational database table) that has rows that relate various interaction attributes with a particular interaction event. As another example, the event data might be organized and/or stored in a programming code object that has instances corresponding to a particular interaction event and properties that describe the various attributes associated with the event.

When interaction events are detected at message processor 312, the global permissions framework 314 assigns respective sets of global access permissions 112, as determined by a global permissions model 324, to govern the interaction events. Global permissions framework 314 then calls extensible permissions engine 120 to retrieve any instances of extensible access permissions 122 that are to be assigned to the interaction events. Extensible permissions engine 120 applies the interaction attributes that describe the respective contexts of the interaction events to the context-aware access policies 124 to determine the extensible access permissions for the events.

As shown, some or all of the interaction attributes may be applied to sets of extensible permissions rules 346 associated with respective instances of the context-aware access policies 124 to facilitate determination of the extensible access permissions. In some cases, extensible access permissions 122 will override global access permissions 112 to govern the interaction events whereas, in other cases, a combination of extensible access permissions 122 and global access permissions 112 may govern the interaction events.

Response generator 318 receives sets of extensible access permissions 122 determined by extensible permissions engine 120 to generate and issue responses to the sources of the interaction events. Specifically, interaction responses generated by response generator 318 are issued as instances of messages 322 to the user devices of the users. For example, consider an interaction event that pertains to a preview of a content object by a user. A set of extensible access permissions corresponding to this interaction event indicates that the content object can be downloaded by the user if a business justification is provided. In this case, response generator 318 will receive the set of extensible access permissions and generate an interaction response that presents a model to the user to request selection by the user of one of several business justification descriptions. When an acceptable business justification is submitted by the user, the content object is provisioned (e.g., in an instance of messages 322) to the user.

Further details pertaining to techniques for establishing (e.g., specifying, recording, etc.) context-aware access policies to govern interactions over content objects (e.g., step 214 of FIG. 2) are disclosed as follows. Additionally, further details pertaining to techniques for establishing policies to govern interactions are disclosed in co-pending U.S. patent application Ser. No. 16/552,956, titled "ACTIVITY-BASED CONTENT OBJECT ACCESS PERMISSIONS", filed on even date herewith, which is hereby incorporated by reference in its entirety.

Figure 4A:
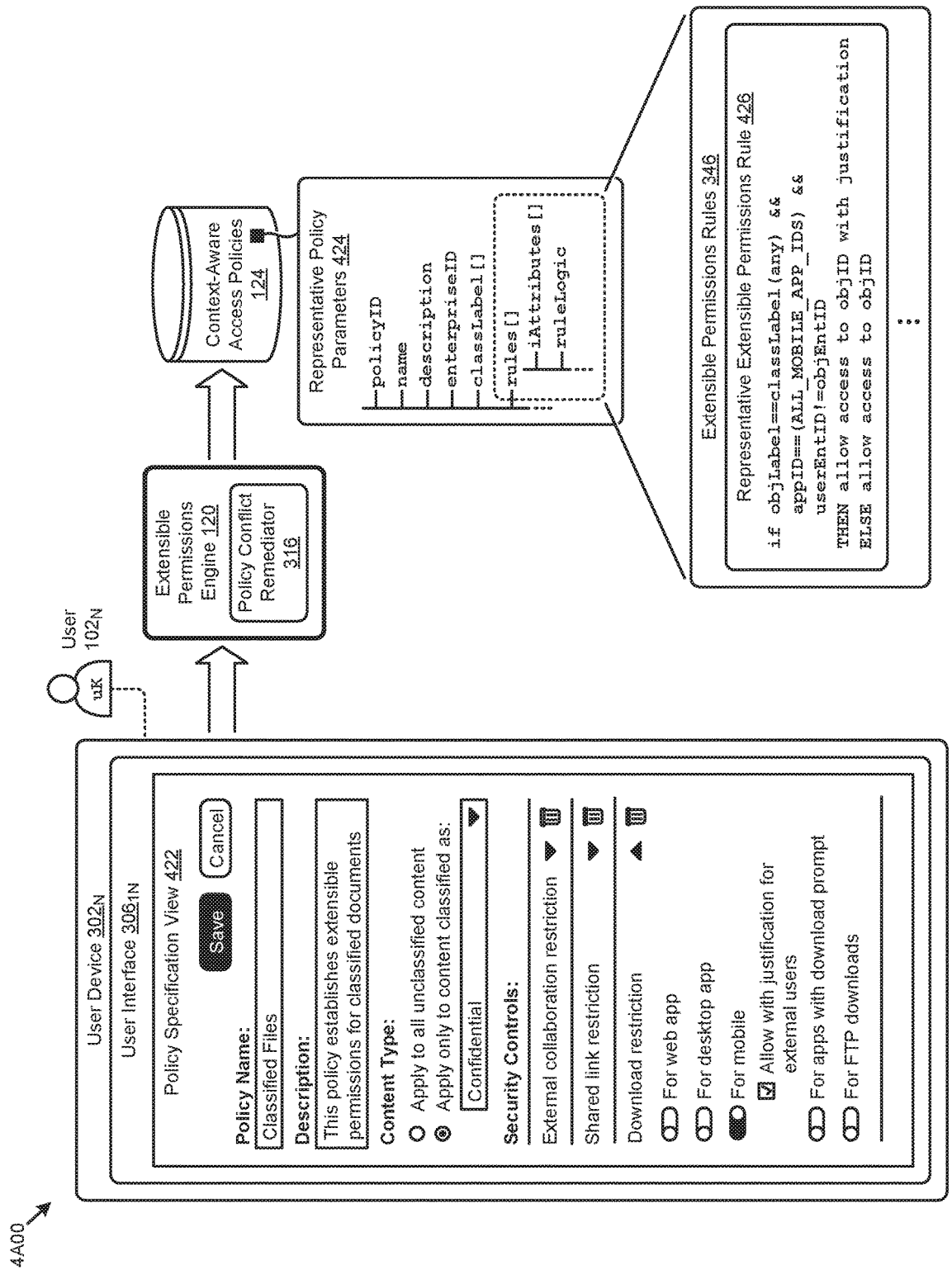
FIG. 4A depicts a context-aware access policy specification technique as implemented in systems that facilitate use of context-aware extensible content object access permissions, according to an embodiment.

FIG. 4A depicts a context-aware access policy specification technique 4A00 as implemented in systems that facilitate use of context-aware extensible content object access permissions. As an option, one or more variations of context-aware access policy specification technique 4A00 or any aspect thereof may be implemented in the context of the architecture and functionality of the embodiments described herein. The context-aware access policy specification technique 4A00 or any aspect thereof may be implemented in any environment.

FIG. 4A illustrates aspects pertaining to analyzing the attributes of interactions with content objects to dynamically determine extensible access permissions. Specifically, the figure is presented to illustrate one embodiment of a user interface and data structure for specifying and recording policy parameters of instances of context-aware access policies. The flow depicted in the figure can represent an embodiment of step 214 of FIG. 2.

The context-aware access policy specification technique 4A00 is facilitated at least in part by a policy specification view 422 presented at user interface $306_{1N}$ of user device $302_N$ associated with user $102_N$. User $102_N$ might be a system administrator of an enterprise who is responsible for establishing at least some of the context-aware access policies for the enterprise. To assist such system administrators, a context management system might provide the policy specification view 422 or other views to collect the user inputs that specify the policy parameters of the context-aware access policies.

Specifically, policy specification view 422 comprises user interface elements (e.g., text boxes, radio buttons, dropdown selection lists, switches, checkboxes, etc.) to collect such user inputs. As can be observed, user $102_N$ can manipulate the user interface elements to specify a policy name (e.g., entered in a "Policy Name" text box), a policy description (e.g., entered in a "Description" text box), a classification label associated with the policy (e.g., enabled by a radio button and selected in a dropdown in a "Content Type" section), one or more security controls (e.g., as selected in a "Security Controls" section), and/or other policy attributes. A classification label, as used herein, is a data object that is assigned to one or more content objects to identify a respective context-aware access policy to apply to the content objects having that classification label.

As can be observed in policy specification view 422, for example, a classification label defined by the text string "Confidential" is associated with the "Classified Files" policy. As such, any interactions with any content objects having the classification label of "Confidential" will be governed by the "Classified Files" policy. In some cases, multiple classification labels might be associated with a particular context-aware access policy.

Further details regarding general approaches to specifying policies and observing security controls are described in U.S. patent application Ser. No. 16/553,063 titled "POLICY-BASED USER DEVICE SECURITY CHECKS", filed on Aug. 27, 2019, which is hereby incorporated by reference in its entirety.

When user $102_N$ clicks the "Save" button in policy specification view 422, the user inputs from the view are submitted to extensible permissions engine 120. After certain policy conflict remediation operations are performed by policy conflict remediator 316 as earlier described, the policy parameters associated with the "Classified Files" policy are recorded in context-aware access policies 124. As depicted in a set of representative policy parameters 424, each policy in context-aware access policies 124 might be describe by a policy identifier (e.g., stored in a "policyID" field), a policy name (e.g., stored in a "name" field), a policy description (e.g., stored in a "description" field), an enterprise identifier (e.g., stored in an "enterpriseID" field), one or more classification labels (e.g., stored in a "classLabel[ ]" object), one or more extensible permissions rules (e.g., stored in a "rules[ ]" object), and/or other parameters.

As facilitated by foregoing representative policy parameters, a particular context-aware access policy can be uniquely selected for a subject content object using the classification label (e.g., as specified in the "classLabel[ ]" object) and enterprise identifier (e.g., as specified in the "enterpriseID" field) that corresponds to the subject content object.

A set of rules (e.g., rule base), such as the extensible permissions rules 346 stored in the "rules[ ]" object or any other rules described herein, comprises data records storing various information that can be used to form one or more constraints to apply to certain functions and/or operations. For example, information pertaining to a rule in the rule base might comprise conditional logic operands (e.g., input variables, conditions, constraints, etc.) and/or conditional logic operators (e.g., "if", "then", "and", "or", "greater than", "less than", etc.) for forming a conditional logic statement that returns one or more results. In some cases, the information pertaining to a rule might comprise conditions (e.g., predicates, conditional expressions, field names, field values, etc.) and commands and/or clauses (e.g., "select", "where", "order by", etc.) for forming a data statement (e.g., query) that returns one or more results. As shown in representative policy parameters 424, the aforementioned conditional logic operands may comprise various interaction attributes (e.g., stored in an "iAttributes[ ]" object) and the aforementioned conditional logic operators may be incorporated into one or more conditional logic statements (e.g., codified in instances of "ruleLogic") that have placeholder for the interaction attributes.

One example of such rules is depicted in a representative extensible permissions rule 426. The representative extensible permissions rule 426 is formed by extensible permissions engine 120 in response to the "Download restriction" specified in policy specification view 422 "For mobile" devices and/or applications. More specifically, the shown user inputs of policy specification view 422 indicate that any downloads of content objects classified as "Confidential" by an enterprise are allowed with justification when the download requests are from the mobile applications of users external to the enterprise. In response to this download restriction as specified in policy specification view 422, the representative extensible permissions rule 426 is formed and recorded in context-aware access policies 124. The rule specifically states that if a content object has a classification label that is equal to any of the classification labels associated with the policy (e.g., "objLabel=classLabel (any)"), and the application is a mobile application (e.g., "appID= (ALL_MOBILE_APP_IDs)"), and the user is not from the enterprise associated with the content object (e.g., "userEntID!=objEntID"), then access is allow with justification. For all other conditions, access to the content object is allowed.

The foregoing pertains to merely one illustrative set of scenarios. Other scenarios include shared link permissions/restrictions and/or external collaboration permissions/restrictions. Some of such scenarios can be based on user-provided and/or administrator-provided specifications that apply to handling of shared links, and some of such scenarios can be based on user-provided and/or administrator-provided specifications that apply to handling of external collaborators. Strictly as examples, sample user interfaces that support specification of permissions/restrictions and/or specification of external collaboration permissions/restrictions are shown and described as pertains to FIG. 4B and FIG. 4C.

Figure 4B:
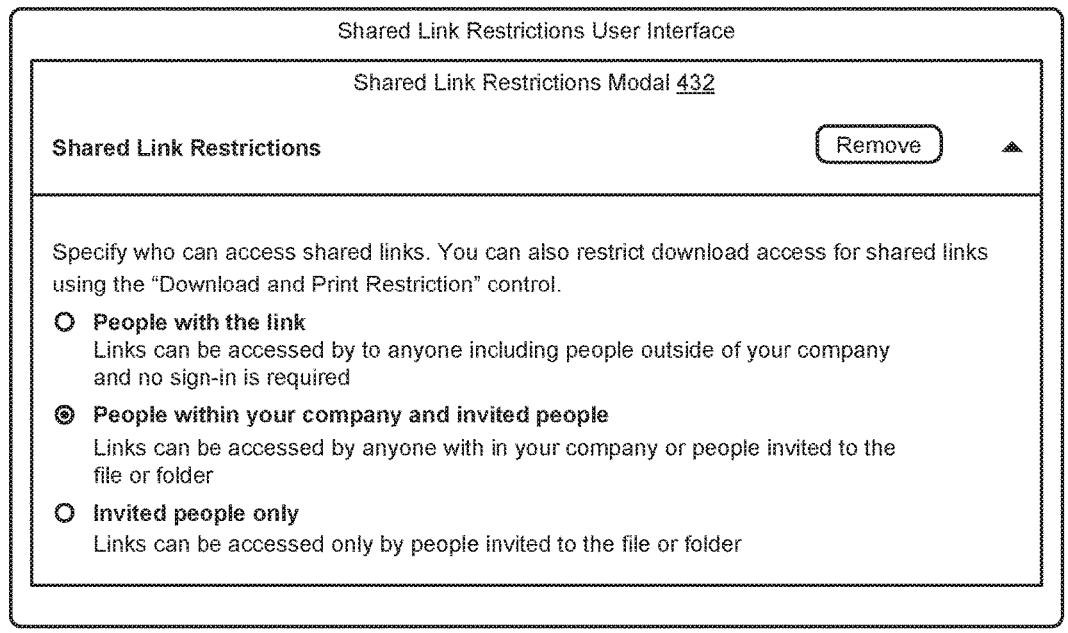
FIG. 4B depicts a shared link restriction specification technique as implemented in systems that facilitate use of context-aware extensible content object access permissions, according to an embodiment.

FIG. 4B depicts a shared link restriction specification technique 4B00 as implemented in systems that facilitate use of context-aware extensible content object access permissions. As an option, one or more variations of shared link restriction specification technique 4B00 or any aspect thereof may be implemented in the context of the architecture and functionality of the embodiments described herein. The shared link restriction specification technique 4B00 or any aspect thereof may be implemented in any environment.

As shown, a shared link restrictions model 432 is included in a user interface. The user interface might be presented to a policy owner who might be a system administrator of an enterprise, and who is responsible for establishing at least some of the context-aware access policies for the enterprise.

The user interface facilitates specification of shared link restrictions. Strictly as examples, the user interface might include several options for the policy owner to select. The particular semantics of the options, and the particular graphical user interface mechanism for allowing unambiguous specification of shared link restrictions, are implementation specific and may vary depending on the range of options that are applicable in any given content management system.

Strictly as an illustrative example, the shown shared link restrictions model includes radio buttons that facilitate specification of one particular choice. In this case, the choices are (1) a shared link restriction whereby links can be accessed by anyone including people outside of the enterprise (no sign-in is required), or (2) a shared link restriction whereby links can be accessed by anyone within the enterprise or by people who are invited to the file or folder, or (3) a shared link restriction whereby links can be accessed only by people invited to the file or folder.

Figure 4C:
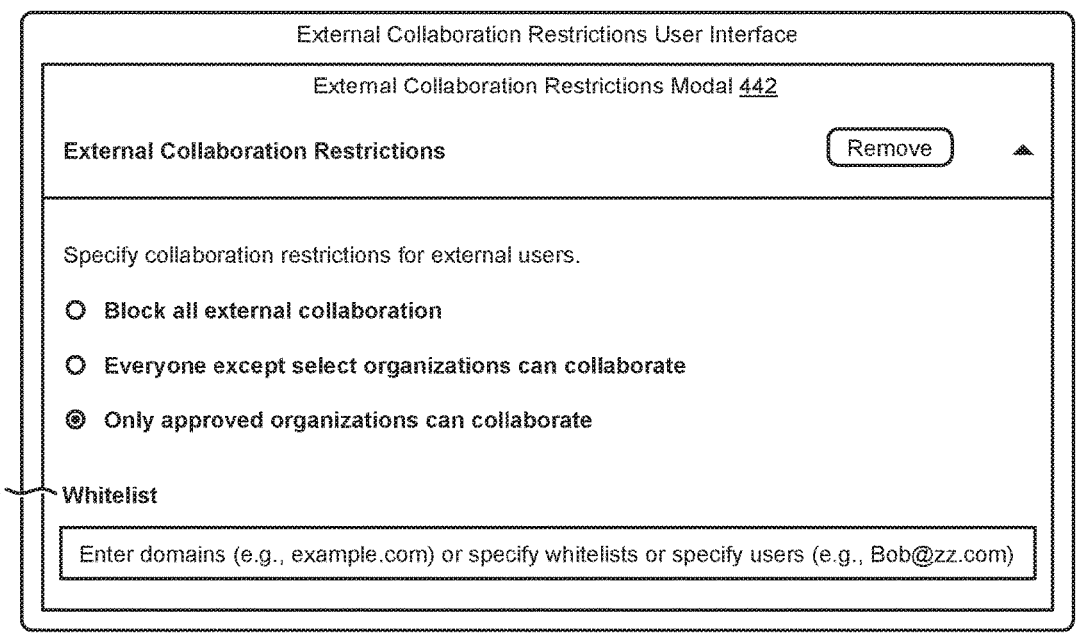
FIG. 4C depicts an external collaboration restriction specification technique as implemented in systems that facilitate use of context-aware extensible content object access permissions, according to an embodiment.

FIG. 4C depicts an external collaboration restriction specification technique 4C00 as implemented in systems that facilitate use of context-aware extensible content object access permissions. As an option, one or more variations of external collaboration restriction specification technique 4C00 or any aspect thereof may be implemented in the context of the architecture and functionality of the embodiments described herein. The external collaboration restriction specification technique 4C00 or any aspect thereof may be implemented in any environment.

As shown, an external collaborations restrictions model 442 is included in a user interface. The user interface might be presented to a policy owner who might be a system administrator of an enterprise and who is responsible for establishing at least some of the context-aware access policies for the enterprise.

Strictly as an illustrative example, the shown external collaboration restrictions model includes radio buttons that facilitate specification of one particular choice. In this case, the choices are (1) block all external collaboration, or (2) allow collaboration events for everyone except certain organizations, or (3) allow collaboration events only for approved organizations. The example further depicts a user interface widget that is configured to facilitate whitelisted domains (e.g., example.com) and/or whitelists (e.g., WhiteList.docx) and/or specific users (e.g., Bob@zz.com).

As used herein, a whitelist 434 is a collection of specific domain names and/or specific document names, and/or specific usernames or aliases. In the situation where an access event is subject to evaluation with respect to extensible permissions, the determination to allow or deny the access is made after considering whether or not the user (or computer program) is reliably associated with any of (1) the whitelisted domains, and/or (2) the identities given in a specified whitelist, and/or (3) identified as a whitelisted user.

The foregoing discussions pertaining to FIG. 4A, FIG. 4B, and FIG. 4C include techniques for detecting interaction events, techniques for specifying restrictions that influence what types of interactions and/or what users are allowed or denied to complete the interactions, and techniques for determining the contexts of those interactions. Certain aspects of such techniques are disclosed in further detail as follows.

Figure 5:
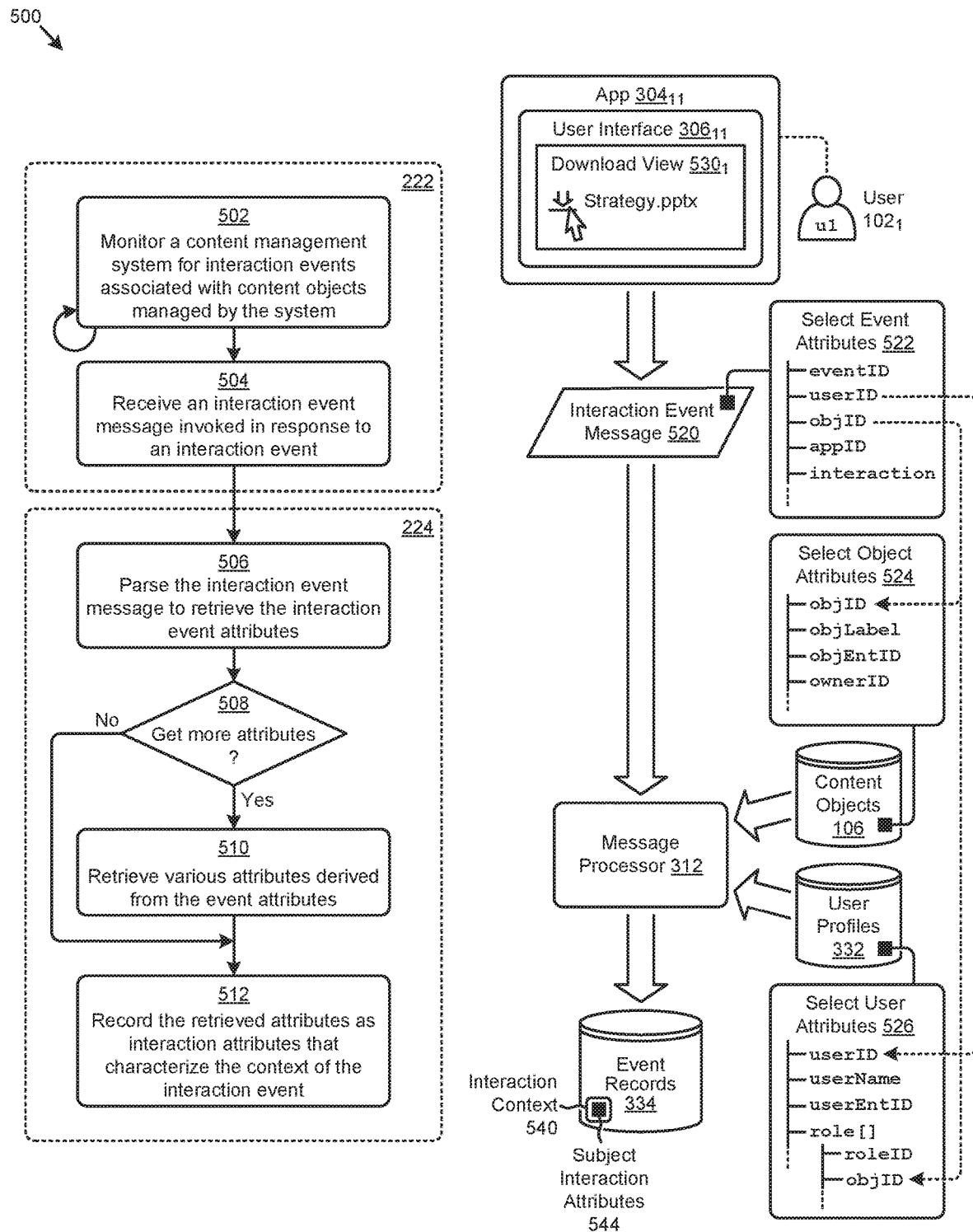
FIG. 5 depicts an interaction event context identification technique as implemented in systems that facilitate use of context-aware extensible content object access permissions, according to an embodiment.

FIG. 5 depicts an interaction event context identification technique 500 as implemented in systems that facilitate use of context-aware extensible content object access permissions. As an option, one or more variations of interaction event context identification technique 500 or any aspect thereof may be implemented in the context of the architecture and functionality of the embodiments described herein. The interaction event context identification technique 500 or any aspect thereof may be implemented in any environment.

FIG. 5 illustrates aspects pertaining to analyzing the attributes of interactions with content objects to dynamically determine extensible access permissions. Specifically, the figure is presented to illustrate one embodiment of certain steps and/or operations that facilitate detecting interaction events and determining the contexts of those events. As depicted in the figure, the steps and/or operations are associated with step 222 and step 224 of FIG. 2. A representative scenario is also shown in the figure to illustrate an example application of interaction event context identification technique 500.

The interaction event context identification technique 500 commences by monitoring a content management system for interaction events associated with content objects managed by the system (step 502). As illustrated, one or more instances of message processor 312 might monitor all interaction events invoked by users of the content management system. In response to any one of the interaction events, an interaction event message is received (step 504). Referring to the scenario of FIG. 5, consider an interaction event that pertains to user $102_1$ clicking on a download icon in a download view $530_1$ to download a file named "Strategy.pptx". As shown, the download view $530_1$ might be presented in a user interface $306_{11}$ of app $304_{11}$. In response to the foregoing user action, an interaction event message 520 is received at message processor 312.

The interaction event message is parsed to retrieve the event attributes of the interaction event (step 506). As indicated in a set of select event attributes 522, interaction event message 520 might be characterized by attributes that describe an event identifier (e.g., stored in an "eventID" field), a user identifier (e.g., stored in a "userID" field), a content object identifier (e.g., stored in an "objID" field), an application identifier (e.g., stored in an "appID" field), an interaction type (e.g., stored in an "interaction" field), and/or other attributes. In some situations, additional attributes might be required to characterize the interaction event ("Yes" path of decision 508), in which case various other attributes derived from the event attributes are retrieved (step 510).

As shown, certain content objects attributes (e.g., content object metadata) might be retrieved from content objects 106 using the content object identifier (e.g., "objID" attribute) from interaction event message 520, and/or certain user attributes might be retrieved from user profiles 332 using the user identifier (e.g., "userID" attribute) from interaction event message 520. As depicted in a set of select object attributes 524, the retrieved object attributes might include a classification label assigned to the content object (e.g., stored in an "objLabel" field). A classification label might be assigned to the content object by operation of a rule or parser that considers the subject matter of the content object. For example, a particular content object might be associated with subject matter that is known to be sensitive, and as such is labeled such that the attribute "objLabel" takes on the value "sensitive". Or, a particular content object might be deemed to be a legal document of a nature that is automatically labeled as "sensitive".

Alternatively, or in addition to the foregoing event attributes, additional event attributes might include an enterprise identifier associated with the content object (e.g., stored in an "objEntID" field), a content object owner identifier (e.g., stored in an "ownerID" field), and/or other object attributes. Furthermore, and as depicted in a set of select user attributes 526, the retrieved user attributes might include a user name (e.g., stored in a "userName" field), an enterprise identifier associated with the user (e.g., stored in a "userEntID" field), one or more roles assigned to the user (e.g., stored in a "role[ ]" object), and/or other user attributes. As shown, each role (e.g., owner, co-owner, editor, viewer, previewer, uploader, etc.) assigned to a particular user can be represented by a role identifier (e.g., stored in a "roleID") and the object identifier (e.g., stored in an "objID" field) of the content object to which the role identifier applies. Such roles can be accessed to apply, for example, a specific set of access permissions that correspond to specific types of interaction events. Application of such a specific set of access permissions may be in accordance with a global permissions model.

When all desired attributes associated with an interaction event are retrieved (e.g., "No" path of decision 508 or completion of step 510), then the retrieved attributes are recorded as a set of interaction attributes that characterize the context of the interaction event (step 512). As depicted in the scenario of FIG. 5, message processor 312 can record a set of subject interaction attributes 544 associated with interaction event message 520 in event records 334. In this case, subject interaction attributes 544 characterize an interaction context 540 that corresponds to the download request from user $102_1$ at app $304_{11}$.

The foregoing discussions include techniques for applying the contexts (e.g., as characterized by interaction attributes) of interaction events to context-aware access policies to determine sets of extensible permissions to govern the interaction events (e.g., step 226 of FIG. 2), which techniques are disclosed in further detail as follows.

Figure 6:
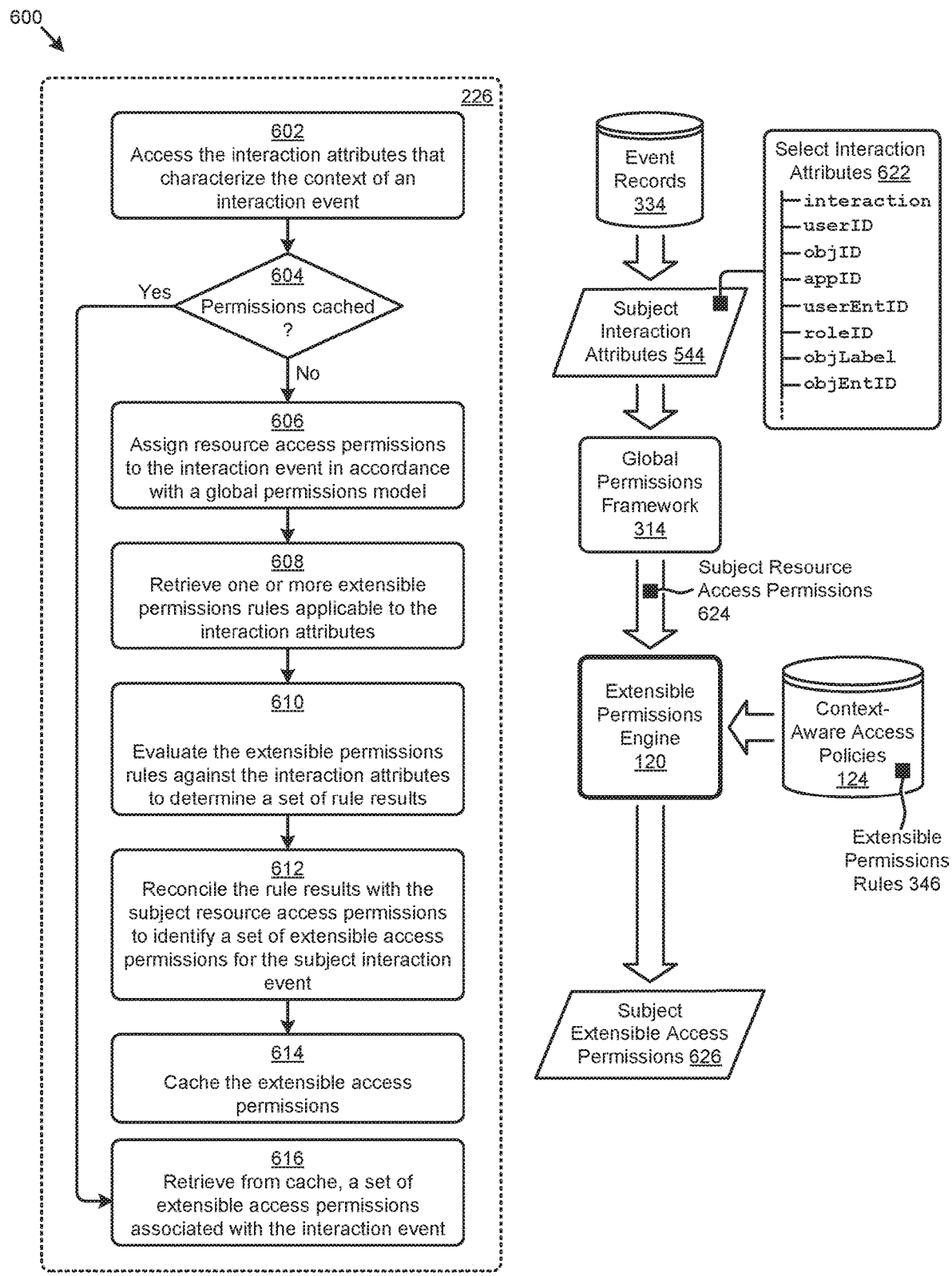
FIG. 6 depicts a rule-based extensible access permissions override technique as implemented in systems that facilitate use of context-aware extensible content object access permissions, according to an embodiment.

FIG. 6 depicts a rule-based extensible access permissions override technique 600 as implemented in systems that facilitate use of context-aware extensible content object access permissions. As an option, one or more variations of rule-based extensible access permissions override technique 600 or any aspect thereof may be implemented in the context of the architecture and functionality of the embodiments described herein. The rule-based extensible access permissions override technique 600 or any aspect thereof may be implemented in any environment.

FIG. 6 illustrates aspects pertaining to analyzing attributes of interactions with content objects to dynamically determine extensible access permissions. Specifically, the figure is presented to illustrate one embodiment of certain steps and/or operations that facilitate applying the contexts (e.g., as characterized by interaction attributes) of interaction events to context-aware access policies to determine sets of extensible permissions to govern the interaction events. As depicted in the figure, the steps and/or operations are associated with step 226 of FIG. 2. A representative scenario is also shown in the figure to illustrate an example application of rule-based extensible access permissions override technique 600.

The rule-based extensible access permissions override technique 600 commences by accessing the interaction attributes that characterize the context of an interaction event (step 602). Continuing the scenario depicted in FIG. 5, the subject interaction attributes 544 earlier described are accessed at event records 334 of a content management system. As indicated in a set of select interaction attributes 622, subject interaction attributes 544 might describe an interaction type (e.g., stored in an "interaction" field), a user identifier (e.g., stored in a "userID" field), a content object identifier (e.g., stored in an "objID" field), an application identifier (e.g., stored in an "appID" field), an enterprise identifier associated with the user (e.g., stored in a "userEntID" field), a role identifier associated with the user (e.g., stored in a "roleID" field), a classification label assigned to the content object (e.g., stored in an "objLabel" field), an enterprise identifier associated with the content object (e.g., stored in an "objEntID" field), and/or other attributes.

If valid extensible access permissions for the particular set of interaction attributes and associated interaction event are stored in a cache memory ("Yes" path of decision 604), then the set of extensible access permissions are retrieved from cache memory (step 616). If no pertinent extensible access permissions are cached ("No" path of decision 604), then a set of global access permissions are assigned to the interaction event in accordance with a global permissions model (step 606). As illustrated in the scenario of FIG. 6, a global permissions framework 314 at the content management system might assign a set of subject resource access permissions 624 to the interaction event that corresponds to subject interaction attributes 544. Specifically, subject resource access permissions 624 might be derived from the role identifier (e.g., the "roleID" attribute of subject interaction attributes 544) associated with interaction event. In some cases, subject resource access permissions 624 might be considered the "default" permissions assigned to the interaction event. According to the herein disclosed techniques, such default permissions may be overridden by a set of extensible access permissions as follows.

One or more extensible permissions rules applicable to the interaction attributes are retrieved (step 608). For example, an instance of extensible permissions engine 120 implemented at the content management system might access a store of context-aware access policies 124 to retrieve a policy that is applicable to the interaction event described by the subject interaction attributes 544. In some cases, an applicable context-aware access policy from context-aware access policies 124 is identified based at least in part on the classification label assigned to the content object (e.g., the "objLabel" attribute of subject interaction attributes 544) and the enterprise identifier associated with the content object (e.g., the "objEntID" attribute of subject interaction attributes 544).

As earlier described, such context-aware access policies often comprise certain respective instances of extensible permissions rules 346. As such, the applicable rules from among a set of extensible access rules associated with the identified context-aware access policy are evaluated subject to some or all of the interaction attributes to determine a set of rule results (step 610). Such rule results are, for example, the outcomes of the logical statements that comprise the rules as evaluated in accordance with the interaction attributes. In this case, the rule results describe certain permissions that may or may not override any access permissions that had already been applied to the interaction event. The rule results are reconciled with the resource access permissions to identify a set of extensible access permissions (e.g., subject extensible access permissions 626) for the interaction event (step 612).

As one permission reconciliation example, resource access permissions provisioned to a user that permits download of a content object may be overridden by rule results that require downloads of the applicable content are to be blocked. As another permission reconciliation example, resource access permissions provisioned to a user that block downloads of a content object may override a rule that allows downloads. When the set of extensible access permissions for the interaction event are determined, the extensible access permissions (e.g., subject extensible access permissions 626) are stored in a cache memory (step 614) for efficient subsequent retrievals (step 616).

The foregoing discussions include techniques for issuing responses to the interaction events in accordance with the extensible access permissions identified for the events (e.g., step 228 of FIG. 2), which techniques are disclosed in further detail as follows.

Figure 7A:
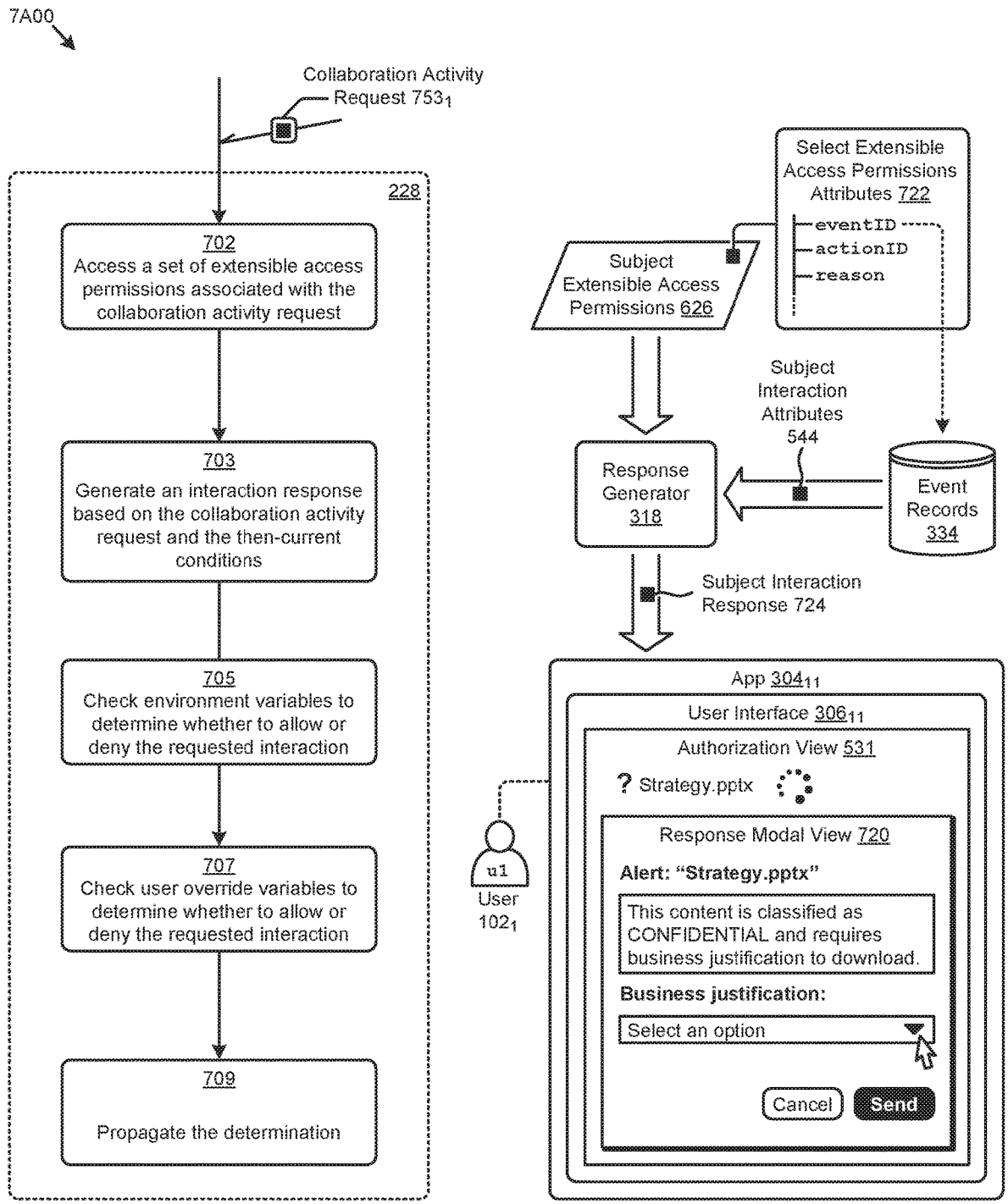
FIG. 7A depicts an interaction event response technique as implemented in systems that facilitate use of context-aware extensible content object access permissions, according to an embodiment.

FIG. 7A depicts an interaction event response technique 7A00 as implemented in systems that facilitate use of context-aware extensible content object access permissions. As an option, one or more variations of interaction event response technique 7A00 or any aspect thereof may be implemented in the context of the architecture and functionality of the embodiments described herein. The interaction event response technique 7A00 or any aspect thereof may be implemented in any environment.

FIG. 7A illustrates aspects pertaining to analyzing the attributes of interactions with content objects to dynamically determine extensible access permissions. Specifically, the figure is presented to illustrate one embodiment of certain steps and/or operations that facilitate issuing responses to interaction events over content objects in accordance with extensible access permissions identified for the interaction events. As depicted in the figure, the steps and/or operations are associated with step 228 of FIG. 2. A representative scenario is also shown in the figure to illustrate an example application of interaction event response technique 7A00.

The interaction event response technique 7A00 commences by accessing a set of extensible access permissions (step 702) associated with an interaction event such as may be codified in a collaboration activity request $753_1$. Continuing the scenario depicted in FIG. 5 and FIG. 6, the subject extensible access permissions 626 earlier described are accessed by an instance of a response generator 318 at a content management system.

It sometimes happens that a single-level inquiry to reach a binary "Yes/No" determination as to whether or not to allow a particular collaboration activity is too restrictive. In some cases a second level of inquiry is undertaken. Strictly as an illustrative example, a second-level inquiry might ask a user for a business reason or other justification as to why a particular collaboration activity should be allowed to proceed for a particular user. The result of such a second-level inquiry can inform one or more extensible access permissions 626.

Specifically, and as indicated in this particular embodiment, a set of select extensible access permissions attributes 722, define the scope and applicability of extensible access permissions 626. Such access permissions attributes might describe an event identifier corresponding to the interaction event (e.g., stored in an "eventID" field), a response action identifier (e.g., stored in an "actionID" field), a response reason (e.g., stored in a "reason" field), and/or other attributes that characterize the extensible access permissions. As merely one example, the "actionID" field might be populated with some identifier that refers to an "allow with justification" action, and the corresponding "reason" field might be populated with message that explains the action (e.g., "This content is classified as [objLabel] and requires business justification to download").

Various embodiments pertain to handling business justifications, which justifications may in turn lead to allowing or denying any particular action. To facilitate allowing or denying any particular action based on a business justification, the "actionID" field might be populated with some identifier that refers to an "allow with justification" action. Furthermore, a corresponding "reason" field might be populated with a message that explains the action (e.g., "The content object referred to at this link is subject to external collaboration restrictions and requires a business justification to access.").

An interaction response is generated based on the collaboration activity request and based on the then-current conditions such as the then-current states of the extensible access permissions (step 703) and/or based on then-current environment settings (step 705). As can observed, response generator 318 might access some or all of the subject interaction attributes 544 associated with subject extensible access permissions 626 to generate a subject interaction response 724. The subject interaction attributes 544 can be retrieved from event records 334 using the event identifier (e.g., stored in the "eventID" field) associated with subject extensible access permissions 626.

At step 705, a determination is made as to whether or not an extensible permission can be set in a manner that allows the actions pertaining to the collaboration activity request. In some cases such a determination is made based on interaction with a selected user (e.g., the user that raised the collaboration activity request, and/or a different authorized user). In some cases, the selected user is different from the user that raised the collaboration activity request. More specifically, the particular collaboration activity request might be a collaboration activity that is subjected to an interactive determination (step 707) as to whether or not the collaboration activity request is to be allowed or denied. Scenarios that invoke such authorizations are shown and described as pertains to FIG. 7B and FIG. 7C and FIG. 7D.

In the particular scenario of FIG. 7A, app 30411 is operated by or otherwise associated with user 1021. As such, subject interaction response 724 causes an authorization view 531 to be presented in user interface 30611 of app 30411. The information contained in subject interaction response 724 is accessed to populate response model view 720. Specifically, response model view 720 facilitates the application of subject extensible access permissions 626 by presenting the reason associated with the granting of permissions. The shown response model view 720 serves as one possible mechanism for receiving the business justification and for allowing a particular collaboration activity (e.g., download) to be carried out by the requestor. More specifically, if an acceptable business justification is provided by an authorized user, then permission to carry out the particular collaboration activity (e.g., to access the content object "Strategy.pptx" file) is granted when the "Send" button is clicked.

The determinations of step 705 and step 707 might be to allow the action or actions corresponding to the collaboration activity request, or the determinations might be to deny the action or actions corresponding to the collaboration activity request, or the determinations might entail some results other than to allow or deny the action or actions corresponding to the collaboration activity request. In any of the foregoing cases, step 709 serves to propagate the determination. Strictly as one example, a determination to allow the action or actions corresponding to the collaboration activity request might be conditioned with respect to a time window.

Figure 7B:
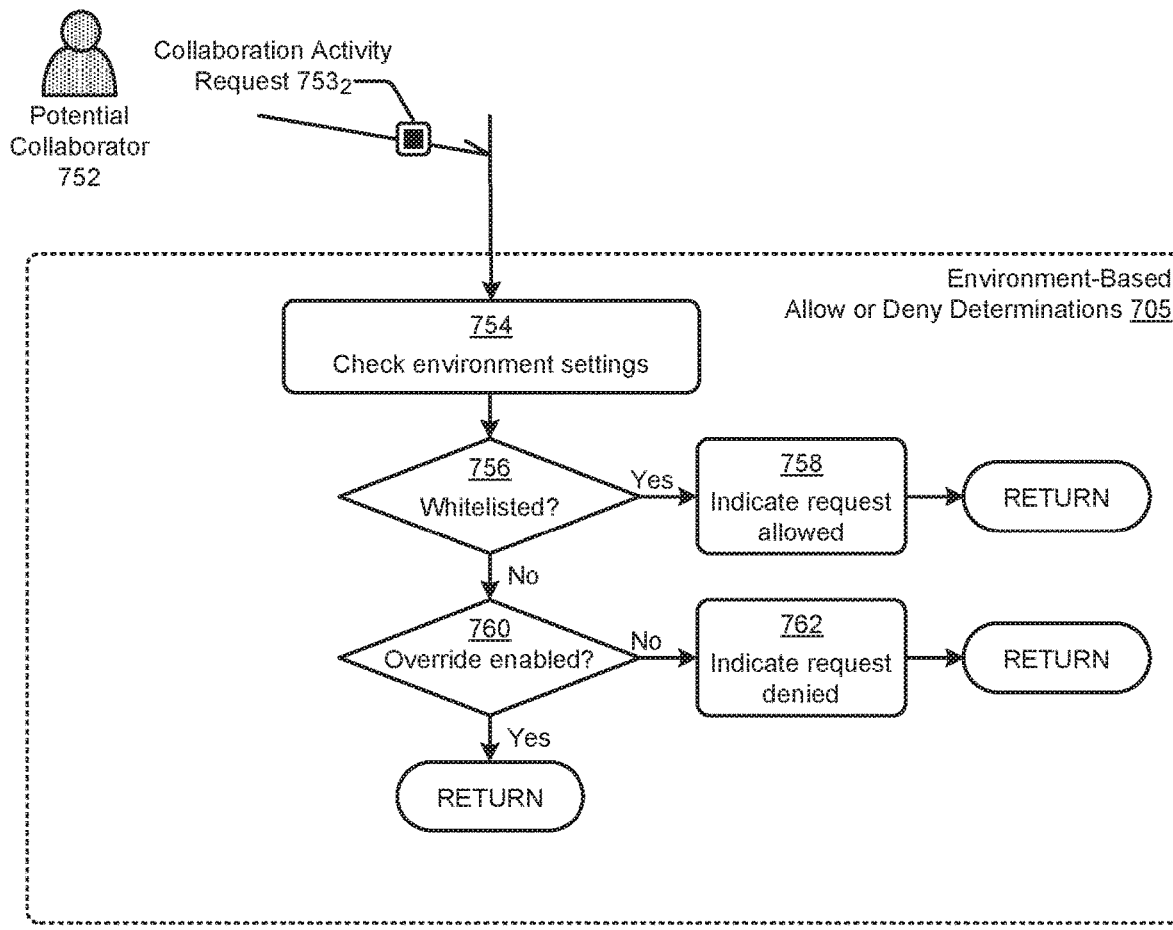
FIG. 7B and FIG. 7C depict aspects of a processing flow to reach an allow determination or a deny determination for a particular collaboration activity request, according to an embodiment.
Figure 7C:
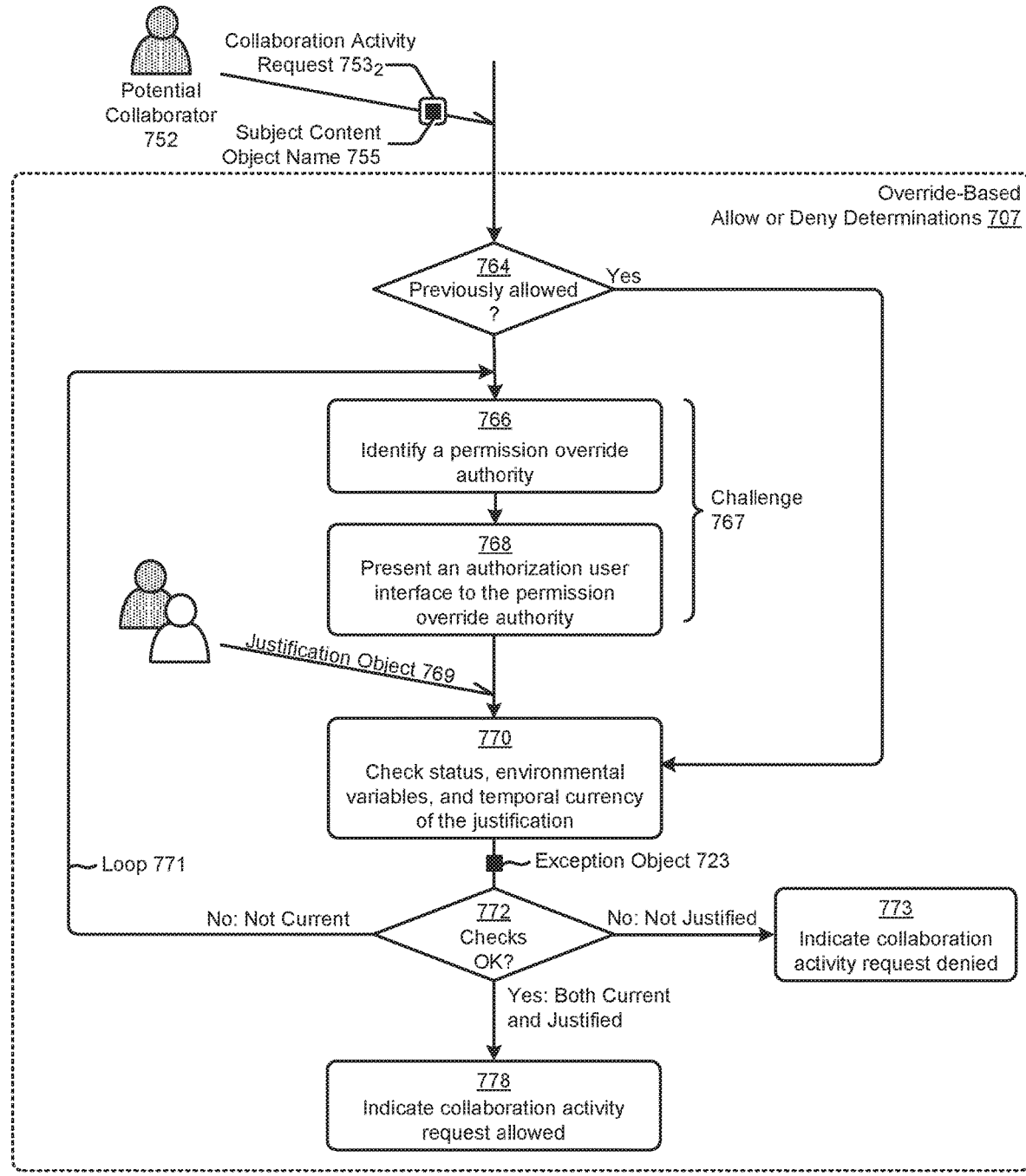
Figure 7D:
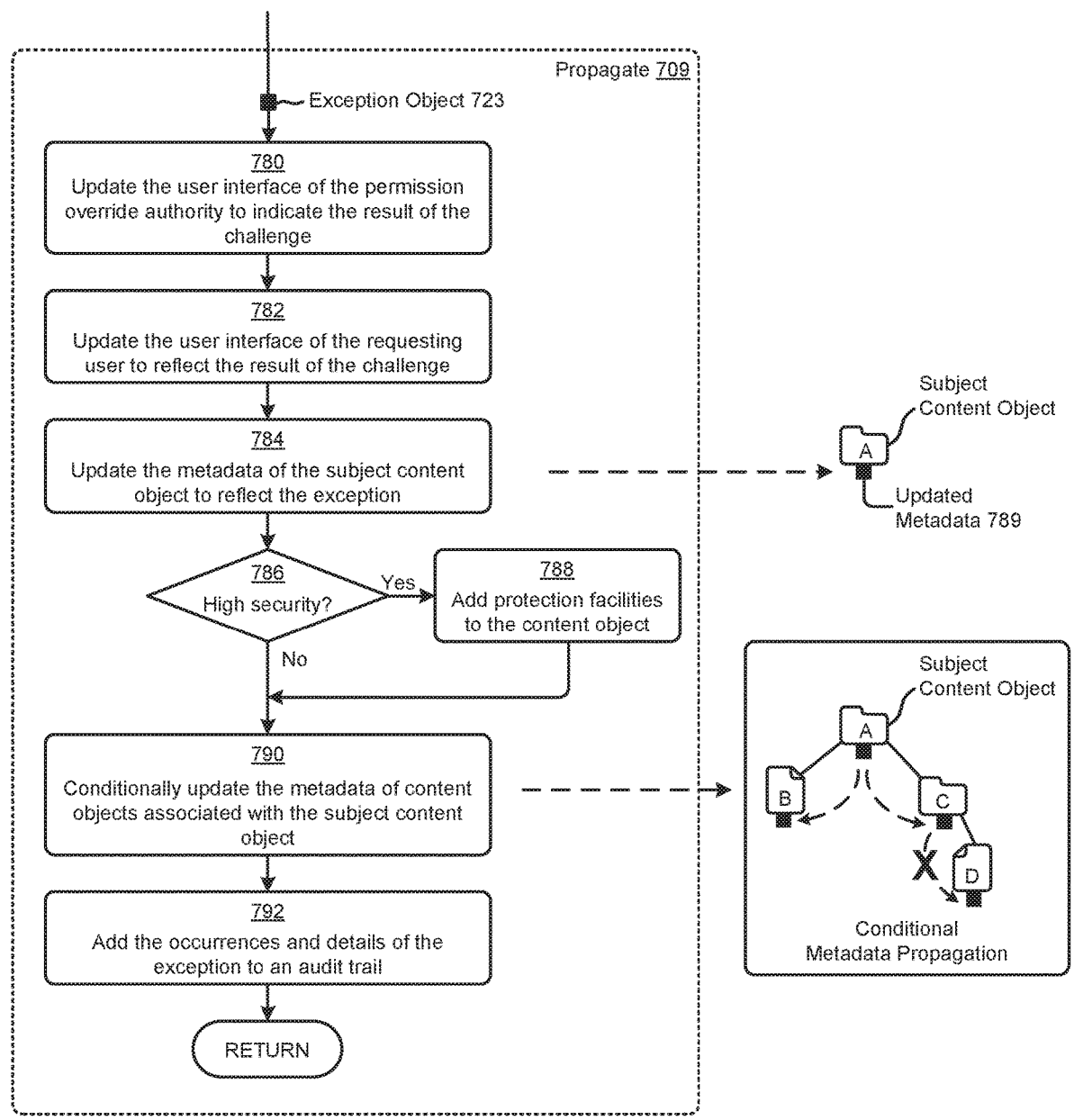
FIG. 7D depicts aspects of a processing flow for propagating results of an allow or deny determination for a particular collaboration activity request, according to an embodiment.

Various embodiments of step 705, step 707 and step 709 are shown and described as pertains to FIG. 7B, FIG. 7C, and FIG. 7D.

FIG. 7B and FIG. 7C depict aspects of a processing flow to reach an allow determination or a deny determination for a particular collaboration activity request. As an option, one or more variations of the processing flow to reach an allow or deny determination or any aspect thereof may be implemented in the context of the architecture and functionality of the embodiments described herein. The processing flow to reach an allow or deny determination or any aspect thereof may be implemented in any environment.

As shown in FIG. 7B, a set of environment-based allow or deny determinations are made based on attributes of potential collaborator 752 and/or any information available in the shown collaboration activity request 753₂. Specifically, step 754 represents a process to check that environmental preferences, variables, settings, etc. are configured to determine whether or not the content management system has been configured to permit use of whitelists and/or determine whether or not the content management system has been configured to permit overrides.

In the case where whitelists are permitted, decision 756 serves to determine if the potential collaborator is listed on any one or more whitelists. The potential collaborator might be deemed to be on a whitelist if the domain name from which the potential collaborator had raised the collaboration activity request appears on a whitelist. Additionally or alternatively, a potential collaborator might be deemed to be on a whitelist if the username or user alias under which the potential collaborator had raised the collaboration activity request appears on a whitelist. When the "Yes" branch of decision 756 is taken, then step 758 executes and the collaboration activity request is permitted to proceed. On the other hand, when the "No" branch of decision 756 is taken, the collaboration activity request is further considered with the potential that the collaboration activity request might be granted based on some criteria other than the whitelist.

Strictly as one example, while a particular content management system might support one or more features for overriding permissions, it can happen that an administrator of the content management system might decide to disable such features. To accommodate this possibility, decision 760 performs checks to determine whether or not the needed features for overriding permissions is enabled. If not, the "No" branch of decision 760 is taken and the request is denied (step 762).

Some implementations involve criteria other than environmental settings and/or other than whitelist-related criteria and/or other than override setting criteria. Some such implementations are shown and described as pertains to FIG. 7C.

As shown, the processing flow of FIG. 7C is entered after a determination is made at decision 760 that overrides of permissions is enabled in the content management system. More specifically, when the "Yes" branch of decision 760 is taken, the processing flow returns to the caller. In the foregoing example embodiments, the processing returns to the flow of FIG. 7A just before step 707. Step 707 may avail of the processing flow of FIG. 7C. Moreover, the same collaboration activity request 753₂ of FIG. 7B is made available to the processing flow of FIG. 7C. Certain data items that are part of, or are associated with, the collaboration activity request 753₂ are used by operations within the processing flow of FIG. 7C. Strictly as one example, the shown collaboration activity request 753₂ includes an identification of the subject content object that corresponds to the collaboration activity request (e.g., subject content object name 755).

Using the identification of the subject content object, decision 764 is able to determine if the collaboration activity request over the particular subject content object had been previously allowed (e.g., via a previous user-provided justification). If so, the "Yes" branch of decision 764 is taken and further processing is undertaken to determine if the relevant states of the subject content object and/or its environment have changed state. This further processing is undertaken because the conditions that were previously present as pertains to the subject content object and/or its environment might have changed, thus serving to revoke privileges or otherwise invalidating the previous allowance. One way to keep track of file or folder states is to save particular state values in the metadata of a particular content object. Another way to keep track of file or folder states is to save particular state values in a cache that holds the metadata of a particular content object. Yet another way to keep track of file or folder states is to save particular state values to an audit journal holds an audit trail of collaboration activity requests, timings, then-present environmental conditions, and the specific value or values of the changes made to the metadata of a particular content object. The metadata of a particular content object can be defined to hold values that pertain to file timestamps, file ownership, policies that apply to one or more content objects, classification labels that apply to one or more content objects, a file- or policy-owner's enterprise affiliation, a hierarchical lineage indication, as well as a sibling or peer content object enumeration. In some cases, metadata is stored separately from a respective content object (e.g., in a different field or row of a database table), whereas in some cases metadata is stored with a respective content object (e.g., in a hard drive partition that holds a file directory and its constituent files).

If the "No" branch of decision 764 is taken, then a challenge commences by identifying a permission override authority (step 766), after which identification, a challenge user interface is presented to the identified permission override authority (step 768).

The permission override authority can, for example, be the owner of the subject content object, or the permission override authority can be, for example, an administrator, or the permission override authority can be, for example, a boss, or can be the owner of a security policy. In some embodiments, the permission override authority can be an identified human who has been sufficiently vetted so as to reduce the likelihood of unauthorized or malicious acts to be taken over subject content objects. In some cases, a secure identification (e.g., an authentication certificate pertaining to an authorized permission override authority) and its association with a policy can be securely stored such that the secure identification (e.g., a certificate) and/or its association with a policy cannot be modified without detection. In some cases, the secure identification (e.g., a certificate pertaining to an authorized permission override authority) is stored together with, or in association with, a whitelist. In some cases, the secure identification is stored together with, or in association with, an override set.

In some cases, the permission override authority can be the collaboration activity requestor, in which case the justification is deemed to be self-certified. In some cases, the permission override authority is an autonomous agent that executes workflows and/or algorithms to determine whether or not to allow a particular collaboration activity to be performed by a particular collaboration activity requestor. In some cases, such an autonomous agent might deny a particular collaboration activity based on an event-wise behavioral characterization of the particular collaboration activity requestor. In some cases, such an autonomous agent might coordinate resources access permissions across enterprise boundaries. In some cases, such an autonomous agent might be identified with an authentication certificate. Interaction by the identified authority using the authorization user interface, or operation of the aforementioned authenticated agent can result in a particular type of justification, which can in turn be codified into a justification object 769.

There may be some appreciable amount of time between composition and presentation of the authorization user interface to the identified authority. As such, various temporal checks that would influence whether or not the collaboration activity request should be granted are performed asynchronously, beginning when justification object 769 is received at step 770. Since it can happen that decision 764 might have been taken in an earlier timeframe, step 770 is carried out to check the then-current temporal currency and other status of the justification at hand. In addition to checking the temporal currency and other status of the justification at hand, further processing might be undertaken to determine whether or not the relevant states of the subject content object and/or its environment have changed state since the performance of decision 764. If the relevant states of the subject content object and/or its environment have changed state from a previous value, or at least, if the relevant states of the subject content object and/or its environment have changed state in a manner that invalidates the previous allowance, or if the checks of step 770 determine that the justification at hand has expired, then the "Not Current" branch of decision 772 is taken is taken such that the flow control goes to loop 771, where-after a new challenge is presented.

If the checks of step 770 result in a determination that the authority declines to provide a justification, then the "Not Justified" branch of decision 772 is taken, and the flow control goes to step 773, where the collaboration activity request is denied.

On the other hand, if it is determined that the allowance is current, and if it is determined that the justification at hand is valid, or for any other reason or combination of reasons, the justification at hand is deemed to be "OK", then an exception object 723 is populated with the then-current status information as processing proceeds to the "Current and Justified" branch of decision 772. The aforementioned exception object includes fields to capture details pertaining to the occurrence of the collaboration activity request, fields for environmental and content object states, a field for a final exception determination, fields to capture details pertaining to a time-bounded validity period, etc. Such fields and any populated values are used for further processing of the collaboration activity request and/or for auditing purposes.

In some embodiments a collaboration activity request might be temporally limited, and corresponding checks (e.g., the checks of step 770) can be undertaken when making allow or deny determinations. Strictly as an example it can happen that a designated authority had limited the allowability of the collaboration activity request to a particular time period (e.g., from May 1 through June 30), and the validity (e.g., currency) of the allowance can be checked against the date range. In some implementations, the time-bounded validity period is stored in the exception object. In other implementations, the time-bounded validity period is stored in metadata pertaining to the subject content object.

After the foregoing tests in which determinations and/or challenge(s) have been accomplished successfully, and if an authority has provided sufficient justification for the override, step 778 is carried out to indicate that the collaboration activity request has been allowed.

FIG. 7D depicts aspects of a processing flow for propagating results of an allow or deny determination for a particular collaboration activity request. As an option, one or more variations of the processing flow for propagating results or any aspect thereof may be implemented in the context of the architecture and functionality of the embodiments described herein. The processing flow for propagating results or any aspect thereof may be implemented in any environment.

As shown, exception object 723 is provided to the propagation flow of FIG. 7D. Aspects of the field values in the exception object are used to inform the operations of FIG. 7D. Specifically, and as shown, at step 780, the user interface of the permission override authority is updated to reflect the decisions made in flow 707 of FIG. 7C. Also, and as shown, at step 782, the user interface of the requesting user is updated to reflect the result of the challenge that was presented to the override authority. In some cases, the requesting user and the override authority are the same user.

At step 784, metadata that is associated with the subject content object is updated (e.g., updated metadata 789). In some situations, such metadata updates serve to override previously indicated permission limitations. In some situations, such metadata updates serve to rescind or revoke previous allowances. Also, additional processing might be carried out to add protections to the subject content object. Strictly as one example, if the subject content object is classified as "high security" (decision 786) then the "Yes" branch of step 786 is taken and protection facilities are added to the subject content object (step 788). As another example, if the subject content object is classified as "high security" (decision 786) then the "Yes" branch of step 786 is taken and the subject content object is automatically watermarked.

Further details regarding general approaches to watermarking are described in U.S. patent application Ser. No. 16/237,552 titled "EVENT-DRIVEN GENERATION OF WATERMARKED PREVIEWS OF AN OBJECT IN A COLLABORATION ENVIRONMENT", filed on Dec. 31, 2018, which is hereby incorporated by reference in its entirety.

In addition to operation of step 784 to apply metadata updates to the subject content object, any content objects that are associated with the subject content object may be conditionally subjected to metadata propagation. Strictly as one example, if the subject content object is a folder, then conditionally, the metadata of the files that are in that folder might be updated (step 790) to reflect the allowance. The corresponding justification might also be stored in the metadata. Strictly as one example, further content objects that are descendants of a particular content object that has been the subject of an allowance override might be marked in their corresponding metadata with the corresponding justification. In some cases, such as when a security label is applied to a subject descendant, then even though that particular content object had been the subject of an allowance override, that subject descendant might not be marked in their corresponding metadata with the corresponding justification. This is because there are certain security labels than cannot be overridden except by an authorized change that is made to a corresponding security policy. As other examples, if a user has received a justification to collaborate on a folder, then all subfolders and/or child content objects might automatically inherit the justification for that user. Similarly, if user has received a justification to download a folder, then all the child content objects or a subset of the child content objects might inherit the received justification.

Any aspect that pertains to the occurrence of the collaboration activity request, and/or any aspect that pertains to the allowance or denial and/or acceptable justification, or insufficient justification, and/or time-boundedness of any allowance can be delivered to an auditing facility (step 792). As used herein, an auditing facility is a record of actions or attempted actions made over a content object. The records of an auditing facility may be time stamped, and/or time ordered.

FIG. 7E depicts a justification user interface 7E00. As an option, one or more variations of the justification user interface or any aspect thereof may be implemented in the context of the architecture and functionality of the embodiments described herein. A justification user interface or any aspect thereof may be implemented in any environment.

As shown, a pulldown user interface widget facilitates choosing from a set of policy-specific justification options 793. Also shown are user interface widgets that facilitate specification of a start date and end date that defines a time-limited allowability. The end date can be used as a time-based trigger to send a reminder message to the user.

Additional Embodiments of the Disclosure

Additional Practical Application Examples

Figure 8A:
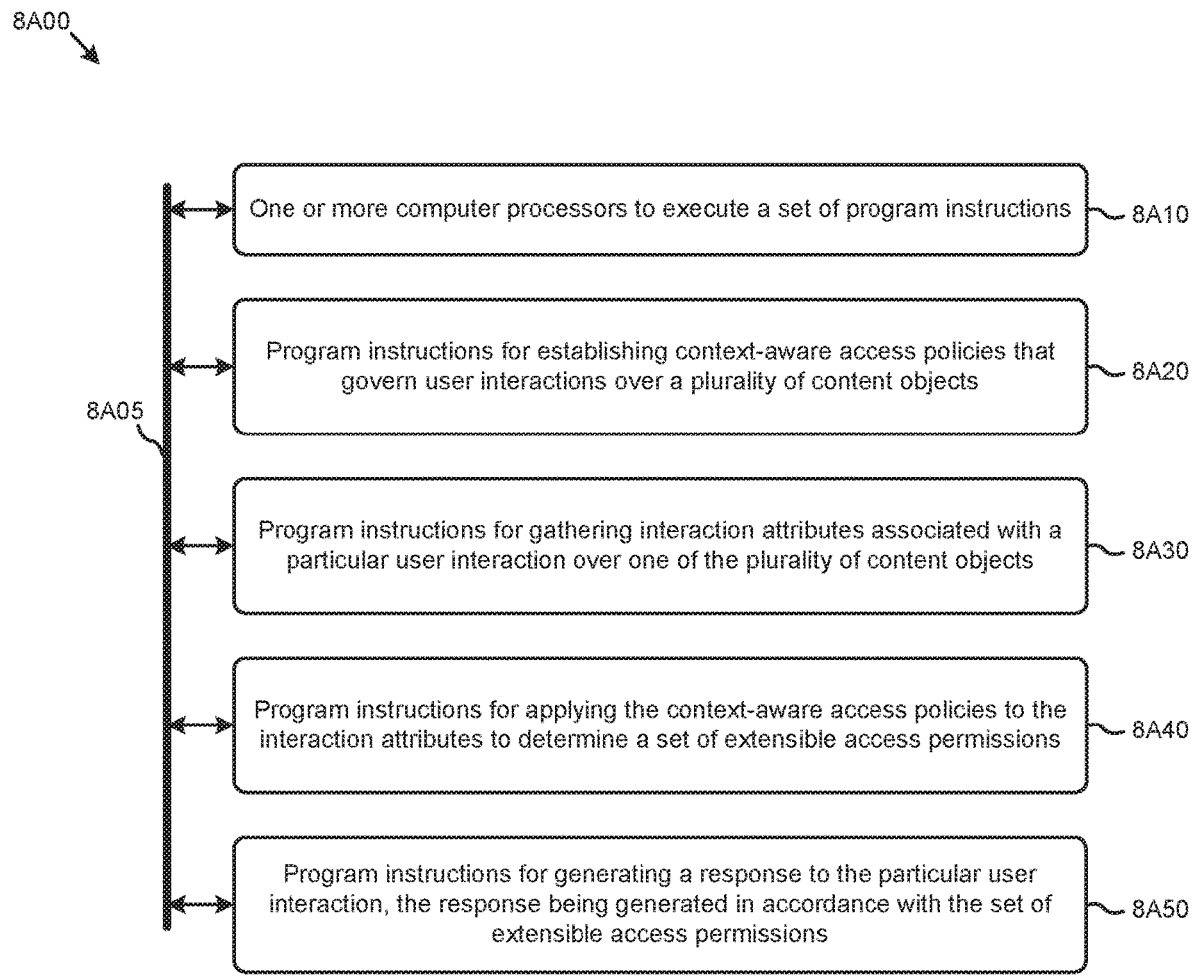
FIG. 8A, FIG. 8B, and FIG. 8C depict system components as arrangements of computing modules that are interconnected so as to implement certain of the herein-disclosed embodiments.

FIG. 8A depicts a system 8A00 as an arrangement of computing modules that are interconnected so as to operate cooperatively to implement certain of the herein-disclosed embodiments. This and other embodiments present particular arrangements of elements that, individually or as combined, serve to form improved technological processes that address the limited applicability of global permissions models. The partitioning of system 8A00 is merely illustrative and other partitions are possible. As an option, the system 8A00 may be implemented in the context of the architecture and functionality of the embodiments described herein. Of course, however, the system 8A00 or any operation therein may be carried out in any desired environment.

The system 8A00 comprises at least one processor and at least one memory, the memory serving to store program instructions corresponding to the operations of the system. As shown, an operation can be implemented in whole or in part using program instructions accessible by a module. The modules are connected to a communication path 8A05, and any operation can communicate with any other operations over communication path 8A05. The modules of the system can, individually or in combination, perform method operations within system 8A00. Any operations performed within system 8A00 may be performed in any order unless as may be specified in the claims.

The shown embodiment implements a portion of a computer system, presented as system 8A00, comprising one or more computer processors to execute a set of program code instructions (module 8A10) and modules for accessing memory to hold program code instructions to perform: establishing context-aware access policies that govern user interactions over a plurality of content objects (module 8A20); gathering interaction attributes associated with a particular user interaction over one of the plurality of content objects (module 8A30); applying the context-aware access policies to the interaction attributes to determine a set of extensible access permissions (module 8A40); and generating a response to the particular user interaction, the response being generated in accordance with the set of extensible access permissions (module 8A50).

Some embodiments further comprise acts for applying global resource access permissions to the particular user interaction; and then overriding the resource access permissions with the set of extensible access permissions. In some embodiments, the context-aware access policies are implemented at least in part by evaluation of extensible permissions rules. More specifically, the extensible permissions rules can be evaluated against at least a portion of the interaction attributes to determine a set of extensible access permissions that correspond to the particular interaction.

There are many ways to enforce the permissions. For example, enforcement might take the form of one or more of, taking no action, allowing the interaction, allowing the interaction but only with a user-provided justification, or blocking the interaction.

Variations of the foregoing may include more or fewer of the shown modules. Certain variations may perform more or fewer (or different) steps and/or certain variations may use data elements in more, or in fewer, or in different operations. Still further, some embodiments include variations in the operations performed, and some embodiments include variations of aspects of the data elements used in the operations.

Figure 8B:
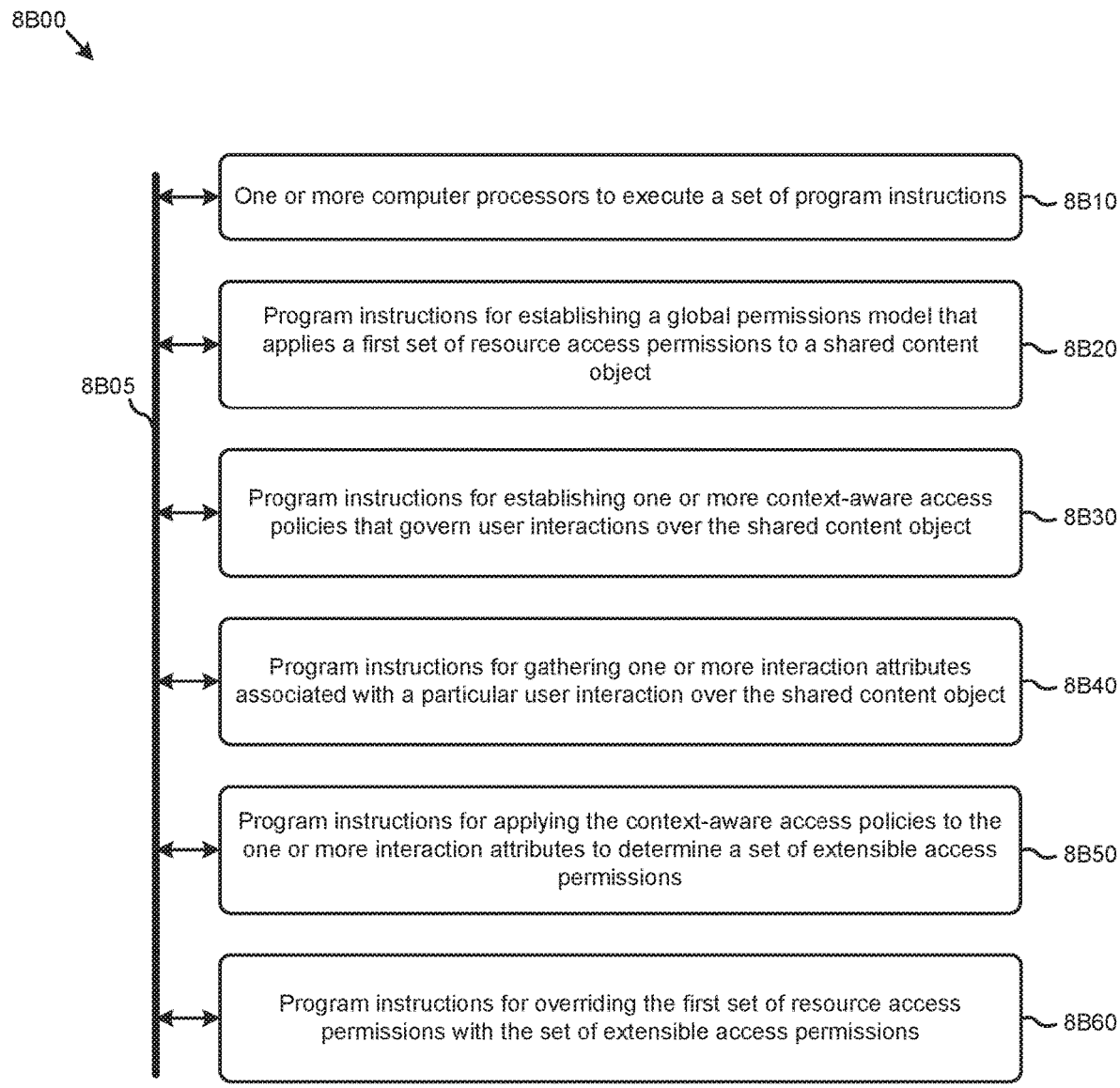

FIG. 8B depicts a system 8B00 as an arrangement of computing modules that are interconnected so as to operate cooperatively to implement certain of the herein-disclosed embodiments. The partitioning of system 8B00 is merely illustrative and other partitions are possible. As an option, the system 8B00 may be implemented in the context of the architecture and functionality of the embodiments described herein. Of course, however, the system 8B00 or any operation therein may be carried out in any desired environment. The system 8B00 comprises at least one processor and at least one memory, the memory serving to store program instructions corresponding to the operations of the system. As shown, an operation can be implemented in whole or in part using program instructions accessible by a module. The modules are connected to a communication path 8B05, and any operation can communicate with any other operations over communication path 8B05. The modules of the system can, individually or in combination, perform method operations within system 8B00. Any operations performed within system 8B00 may be performed in any order unless as may be specified in the claims. The shown embodiment implements a portion of a computer system, presented as system 8B00, comprising one or more computer processors to execute a set of program code instructions (module 8B10) and modules for accessing memory to hold program code instructions to perform: establishing a global permissions model that applies a first set of resource access permissions to a shared content object (module 8B20); establishing one or more context-aware access policies that govern user interactions over the shared content object (module 8B30); gathering one or more interaction attributes associated with a particular user interaction over the shared content object (module 8B40); applying the context-aware access policies to the one or more interaction attributes to determine a set of extensible access permissions (module 8B50); and overriding the first set of resource access permissions with the set of extensible access permissions (module 8B60).

Figure 8C:
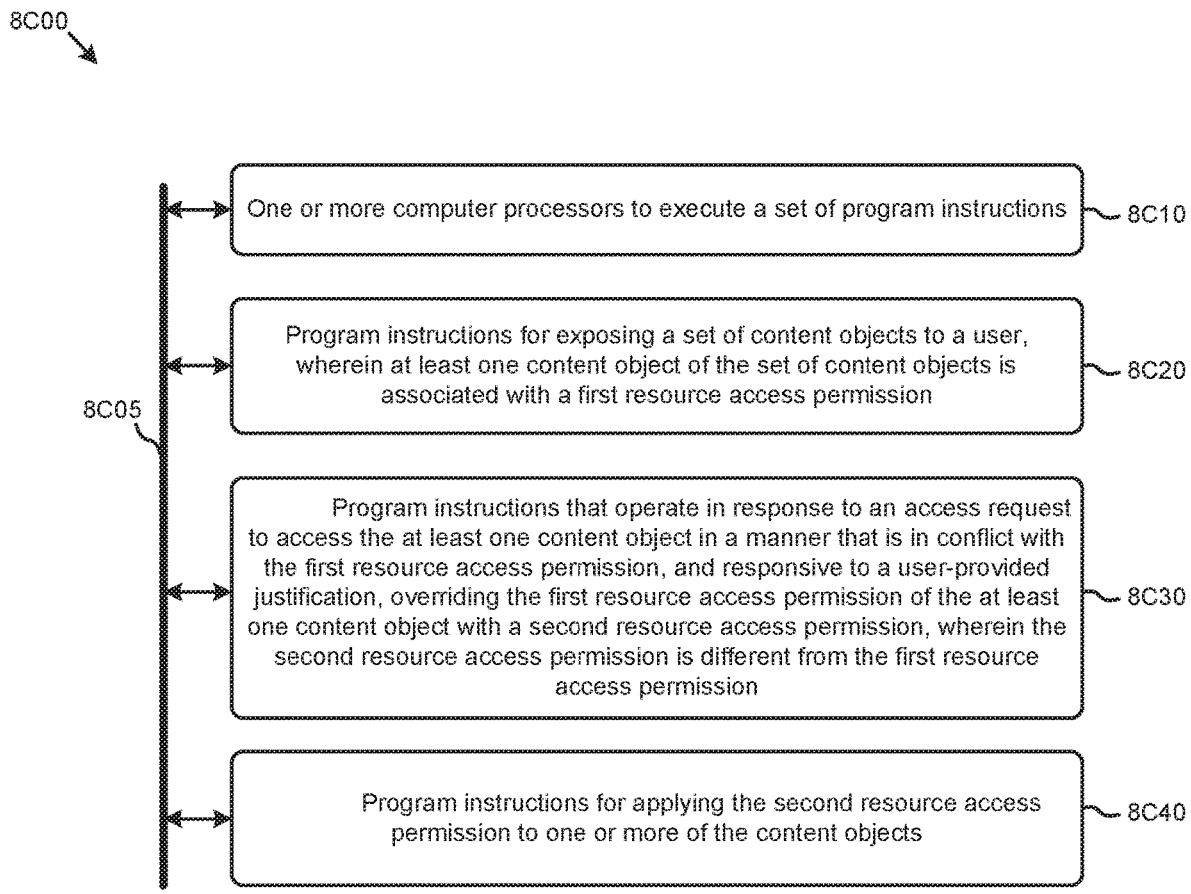

FIG. 8C depicts a system 8C00 as an arrangement of computing modules that are interconnected so as to operate cooperatively to implement certain of the herein-disclosed embodiments. The partitioning of system 8C00 is merely illustrative and other partitions are possible. As an option, the system 8C00 may be implemented in the context of the architecture and functionality of the embodiments described herein. Of course, however, the system 8C00 or any operation therein may be carried out in any desired environment. The system 8C00 comprises at least one processor and at least one memory, the memory serving to store program instructions corresponding to the operations of the system. As shown, an operation can be implemented in whole or in part using program instructions accessible by a module. The modules are connected to a communication path 8C05, and any operation can communicate with any other operations over communication path 8C05. The modules of the system can, individually or in combination, perform method operations within system 8C00. Any operations performed within system 8C00 may be performed in any order unless as may be specified in the claims. The shown embodiment implements a portion of a computer system, presented as system 8C00, comprising one or more computer processors to execute a set of program code instructions (module 8C10) and modules for accessing memory to hold program code instructions to perform: exposing a set of content objects to a user, wherein at least one content object of the set of content objects is associated with a first resource access permission (module 8C20); responsive to an access request to access the at least one content object in a manner that is in conflict with the first resource access permission, and responsive to a user-provided justification, overriding the first resource access permission of the at least one content object with a second resource access permission, wherein the second resource access permission is different from the first resource access permission (module 8C30); and applying the second resource access permission to one or more of the content objects (module 8C40).

System Architecture Overview

Additional System Architecture Examples

Figure 9A:
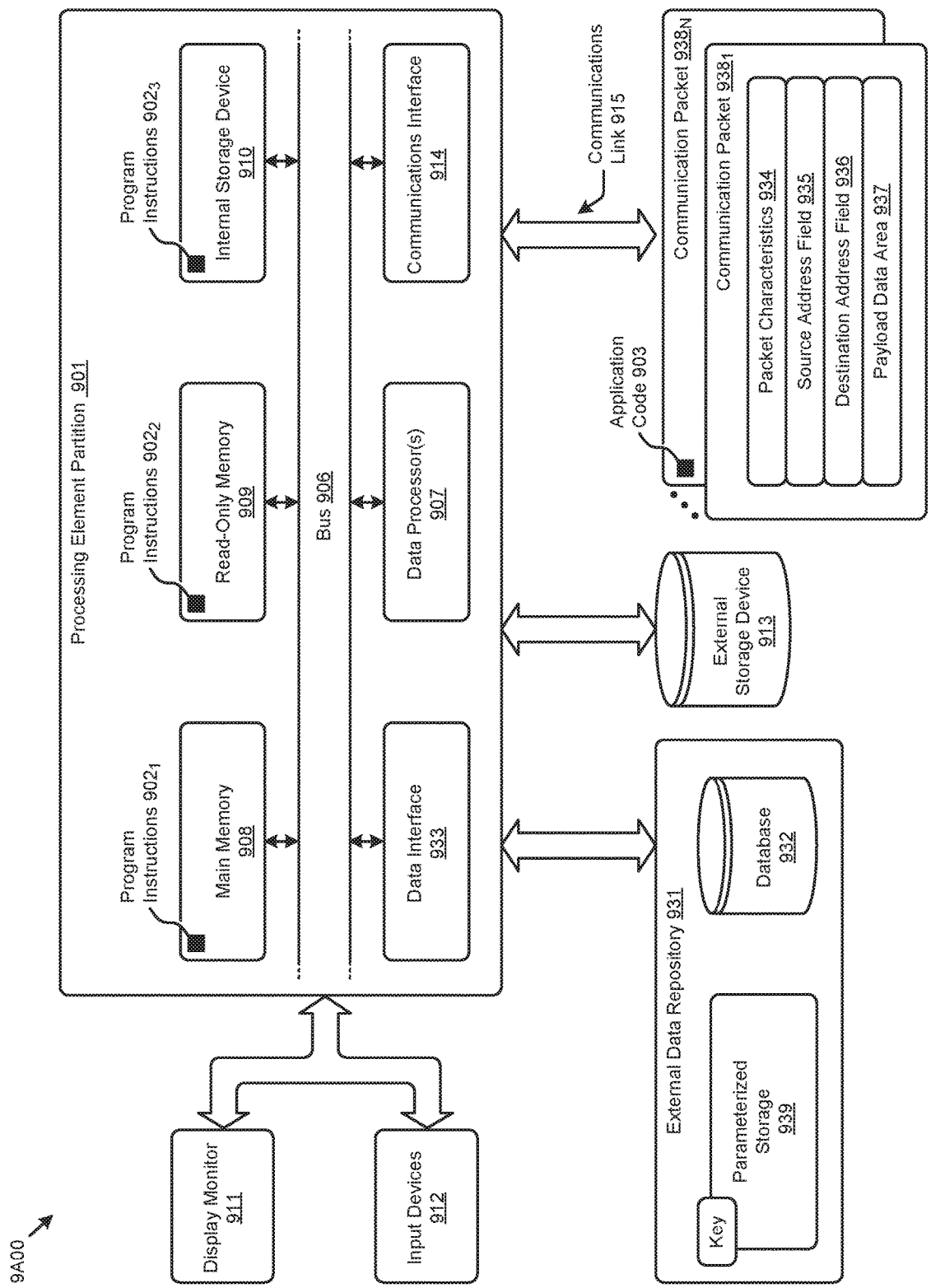
FIG. 9A and FIG. 9B present block diagrams of computer system architectures having components suitable for implementing embodiments of the present disclosure, and/or for use in the herein-described environments.

FIG. 9A depicts a block diagram of an instance of a computer system 9A00 suitable for implementing embodiments of the present disclosure. Computer system 9A00 includes a bus 906 or other communication mechanism for communicating information. The bus interconnects subsystems and devices such as a central processing unit (CPU), or a multi-core CPU (e.g., data processor 907), a system memory (e.g., main memory 908, or an area of random access memory (RAM)), a non-volatile storage device or non-volatile storage area (e.g., read-only memory 909), an internal storage device 910 or external storage device 913 (e.g., magnetic or optical), a data interface 933, a communications interface 914 (e.g., PHY, MAC, Ethernet interface, modem, etc.). The aforementioned components are shown within processing element partition 901, however other partitions are possible. Computer system 9A00 further comprises a display 911 (e.g., CRT or LCD), various input devices 912 (e.g., keyboard, cursor control), and an external data repository 931.

According to an embodiment of the disclosure, computer system 9A00 performs specific operations by data processor 907 executing one or more sequences of one or more program instructions contained in a memory. Such instructions (e.g., program instructions $902_1$, program instructions $902_2$, program instructions $902_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof According to an embodiment of the disclosure, computer system 9A00 performs specific networking operations using one or more instances of communications interface 914. Instances of communications interface 914 may comprise one or more networking ports that are configurable (e.g., pertaining to speed, protocol, physical layer characteristics, media access characteristics, etc.) and any particular instance of communications interface 914 or port thereto can be configured differently from any other particular instance. Portions of a communication protocol can be carried out in whole or in part by any instance of communications interface 914, and data (e.g., packets, data structures, bit fields, etc.) can be positioned in storage locations within communications interface 914, or within system memory, and such data can be accessed (e.g., using random access addressing, or using direct memory access DMA, etc.) by devices such as data processor 907.

Communications link 915 can be configured to transmit (e.g., send, receive, signal, etc.) any types of communications packets (e.g., communication packet $938_1$, communication packet $938_N$) comprising any organization of data items. The data items can comprise a payload data area 937, a destination address 936 (e.g., a destination IP address), a source address 935 (e.g., a source IP address), and can include various encodings or formatting of bit fields to populate packet characteristics 934. In some cases, the packet characteristics include a version identifier, a packet or payload length, a traffic class, a flow label, etc. In some cases, payload data area 937 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 907 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 931, which in turn can be formatted into any one or more storage areas, and which can comprise parameterized storage 939 accessible by a key (e.g., filename, table name, block address, offset address, etc.).

Execution of the sequences of instructions to practice certain embodiments of the disclosure are performed by a single instance of a computer system 9A00. According to certain embodiments of the disclosure, two or more instances of computer system 9A00 coupled by a communications link 915 (e.g., LAN, public switched telephone network, or wireless network) may perform the sequence of instructions required to practice embodiments of the disclosure using two or more instances of components of computer system 9A00.

Computer system 9A00 may transmit and receive messages such as data and/or instructions organized into a data structure (e.g., communications packets). The data structure can include program instructions (e.g., application code 903), communicated through communications link 915 and communications interface 914. Received program instructions may be executed by data processor 907 as it is received and/or stored in the shown storage device or in or upon any other non-volatile storage for later execution. Computer system 9A00 may communicate through a data interface 933 to a database 932 on an external data repository 931. Data items in a database can be accessed using a primary key (e.g., a relational database primary key).

Processing element partition 901 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 907. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to context-aware extensible content object access permissions. A module may include one or more state machines and/or combinational logic used to implement or facilitate the operational and/or performance characteristics pertaining to forming context-aware extensible content object access permissions.

Various implementations of database 932 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of context-aware extensible content object access permissions). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to context-aware extensible content object access permissions, and/or for improving the way data is manipulated when performing computerized operations pertaining to analyzing the attributes of interactions with content objects to dynamically determine extensible access permissions.

Figure 9B:
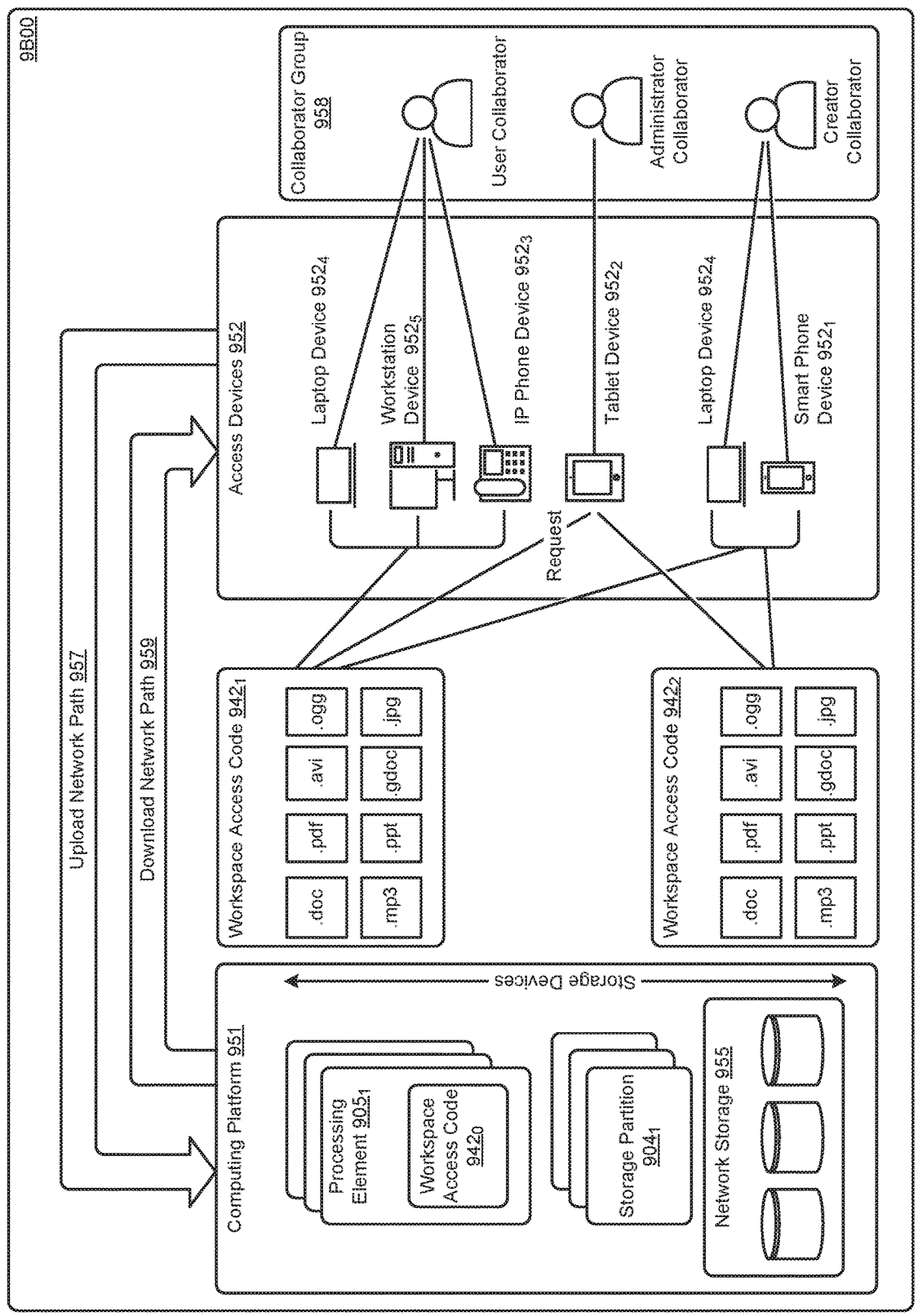

FIG. 9B depicts a block diagram of an instance of a cloud-based environment 9B00. Such a cloud-based environment supports access to workspaces through the execution of workspace access code (e.g., workspace access code $942_0$, workspace access code $942_1$, and workspace access code $942_2$). Workspace access code can be executed on any of access devices 952 (e.g., laptop device $952_4$, workstation device $952_5$, IP phone device $952_3$, tablet device $952_2$, smart phone device $952_1$, etc.), and can be configured to access any type of object. Strictly as examples, such objects can be folders or directories or can be files of any filetype. A group of users can form a collaborator group 958, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 951, including in a middleware setting. As shown, a portion of the workspace access code resides in and can be executed on one or more processing elements (e.g., processing element $905_1$). The workspace access code can interface with storage devices such as networked storage 955. Storage of workspaces and/or any constituent files or objects, and/or any other code or scripts or data can be stored in any one or more storage partitions (e.g., storage partition $904_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 957). A stored workspace can be delivered to a particular user and/or shared with other particular users via a download (e.g., a download from a processing element to an access device over a download network path 959).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method comprising:
   exposing a set of content objects to a first user in an interaction event in a collaboration environment where the first user accesses a content object of the set of content objects, wherein the first user and a second user are permitted to access and collaborate on the content object with a first resource access permission;
   upon a determination that overriding access permissions is enabled in the collaboration environment, responsive to an access request from the second user to access the content object in a manner that is in conflict with the first resource access permission, and responsive to a user-provided justification, determining a second resource access permission based at least in part upon one or more attributes of the interaction event for the first user; and overriding, by the collaboration environment, the first resource access permission of the content object with the second resource access permission, different from the first resource access permission; and applying the second resource access permission to one or more of the set of content objects.

2. The method of claim 1, further comprising:

determining, by the collaboration environment, whether overriding the access permissions is enabled in the collaboration environment; and associating the second resource access permission with further content objects to govern further user interactions.

3. The method of claim 2, wherein the further content objects are descendants of the at least one content object.

4. The method of claim 2, wherein associating the second resource access permission with the further content objects to govern the further user interactions comprises updating content object metadata with at least the second resource access permission.

5. The method of claim 1, wherein the second resource access permission corresponds to at least one of, allowing the access request based on the user-provided justification, allowing the access request based at least in part on a previous user-provided justification, or denying the access request.

6. The method of claim 1, further comprising:

revoking the second resource access permission when metadata of the content object has changed from a previous value as a result of the first user accessing the content object.

7. The method of claim 1, further comprising:

revoking the second resource access permission when a classification label of the content object has changed from a previous value as a result of the first user accessing the content object.

8. The method of claim 1, further comprising:

presenting a policy-specific justification option to the user via a user interface.

9. The method of claim 1, further comprising:

associating an authentication certificate with an identified permission override authority that is either an identified human or an autonomous agent.

10. The method of claim 1, further comprising:

validating the user-provided justification, wherein the second resource access permission comprises a first attribute pertaining to an action that requires justification for the second resource access permission and a second attribute pertaining to a reason for the action.

11. The method of claim 10, wherein the user-provided justification comprises a time-bounded validity period that is checked against a date range in response to receipt of the access request.

12. The method of claim 1, further comprising:

determining, by the collaboration environment, whether overriding the access permissions is enabled in the collaboration environment; and upon the determination that overriding the access permissions is not enabled, denying an override of the first resource access permission of the content object with the second resource access permission based at least in part on a policy of the content management system.

13. The method of claim 1, further comprising:

emitting at least one aspect of the user-provided justification to an auditing facility.

14. A non-transitory computer readable medium having stored thereon a sequence of instructions which, when stored in memory and executed by one or more processors, causes the one or more processors to perform a set of acts, the set of acts comprising:

exposing a set of content objects to a first user in an interaction event in a collaboration environment where the first user accesses a content object of the set of content objects, wherein the first user and a second user are permitted to access and collaborate on the content object with a first resource access permission;

upon a determination that overriding access permissions is enabled, responsive to an access request from the second user to access the content object in a manner that is in conflict with the first resource access permission, and responsive to a user-provided justification, determining a second resource access permission based at least in part upon one or more attributes of the interaction event for the first user; and overriding, by the collaboration environment, the first resource access permission of the content object with the second resource access permission, different from the first resource access permission; and applying the second resource access permission to one or more of the set of content objects.

15. The non-transitory computer readable medium of claim 14, further comprising the instructions which, when stored in the memory and executed by the one or more processors, further causes the one or more processors to perform acts, the acts comprising:

determining, by the collaboration environment, whether overriding the access permissions is enabled in the collaboration environment; and associating the second resource access permission with further content objects to govern further user interactions.

16. The non-transitory computer readable medium of claim 15, wherein the further content objects are descendants of the at least one content object.

17. The non-transitory computer readable medium of claim 14, wherein the second resource access permission corresponds to at least one of, allowing the access request based on the user-provided justification, allowing the access request based at least in part on a previous user-provided justification, or denying the access request.

18. The non-transitory computer readable medium of claim 14, further comprising the instructions which, when stored in the memory and executed by the one or more processors, causes the one or more processors to perform acts, the acts comprising:

revoking the second resource access permission when metadata of the content object has changed from a previous value as a result of the first user accessing the content object.

19. A system comprising:

a non-transitory storage medium having stored thereon a sequence of instructions; and one or more microprocessors that execute the sequence of instructions to cause the one or more microprocessors to perform a set of acts, the set of acts comprising, exposing a set of content objects to a first user in an interaction event in a collaboration environment where the first user accesses a content object of the set of content objects, wherein the first user and a second user are permitted to access and collaborate on the content object with a first resource access permission;

upon a determination that overriding access permissions is enabled, responsive to an access request from the second user to access the content object in a manner that is in conflict with the first resource access permission, and responsive to a user-provided justification, determining a second resource access permission based at least in part upon one or more attributes of the interaction event for the first user; and overriding, by the collaboration environment, the first resource access permission of the content object with the second resource access permission different from the first resource access permission; and applying the second resource access permission to one or more of the set of content objects.

20. The system of claim 19, the set of acts further comprising:

determining, by the collaboration environment, whether overriding the access permissions is enabled in the collaboration environment; and associating the second resource access permission with further content objects to govern further user interactions.

* * * * *